United States Patent
An et al.

(10) Patent No.: US 7,606,601 B2
(45) Date of Patent: Oct. 20, 2009

(54) FAST CALL SETUP SYSTEM AND METHOD IN A MOBILE COMMUNICATIONS SYSTEM

(75) Inventors: Jong Hoe An, Anyang-shi (KR); Chan Ho Kyung, Incheon (KR)

(73) Assignee: LG Electronics Inc., Seoul (KR)

( * ) Notice: Subject to any disclaimer, the term of this patent is extended or adjusted under 35 U.S.C. 154(b) by 376 days.

(21) Appl. No.: 10/871,336

(22) Filed: Jun. 18, 2004

(65) Prior Publication Data

US 2005/0002370 A1    Jan. 6, 2005

(30) Foreign Application Priority Data

Jul. 4, 2003    (KR) ............. 10-2003-0045354
Jul. 28, 2003    (KR) ............. 10-2003-0052026

(51) Int. Cl.
*H04W 24/00* (2006.01)
*H04W 36/00* (2006.01)
*H04B 7/00* (2006.01)

(52) U.S. Cl. ............. 455/574; 455/456.4; 455/458; 455/515

(58) Field of Classification Search ............. 455/515, 455/574, 456.4, 458

See application file for complete search history.

(56) References Cited

U.S. PATENT DOCUMENTS

| | | | | |
|---|---|---|---|---|
| 5,491,718 | A * | 2/1996 | Gould et al. | 370/335 |
| 2002/0191583 | A1 | 12/2002 | Harris et al. | |
| 2003/0032462 | A1 * | 2/2003 | Wang et al. | 455/574 |
| 2003/0114156 | A1 * | 6/2003 | Kinnavy | 455/434 |
| 2004/0042438 | A1 * | 3/2004 | Jiang et al. | 370/342 |
| 2004/0160942 | A1 * | 8/2004 | Kelley et al. | 370/350 |

FOREIGN PATENT DOCUMENTS

| | | |
|---|---|---|
| CN | 02122591 | 7/2005 |
| CN | 1751456 | 3/2006 |
| CN | 01105707 | 4/2006 |
| RU | 2100904 | 12/1997 |
| RU | 2140723 | 10/1999 |
| WO | WO 00/10353 | 2/2000 |
| WO | WO 03/053093 | 6/2003 |

* cited by examiner

*Primary Examiner*—Nick Corsaro
*Assistant Examiner*—Joel Ajayi
(74) *Attorney, Agent, or Firm*—Lee, Hong, Degerman, Kang & Waimey

(57) ABSTRACT

A fast call setup system and method for a mobile communications device is provided. A mobile terminal monitors a paging channel on a first predetermined cycle, the paging channel comprising a plurality of slots for monitoring. After a traffic channel is disconnected upon receiving a release order, the network provides reduced slot cycle parameters to the mobile terminal. The mobile terminal uses these parameters to monitor the paging channel using a reduced slot cycle. Upon the expiration of an operational timer or through an intervention of either the network or the mobile terminal, the reduced slot cycle is terminated and a normal slot cycle is reinstated.

41 Claims, 11 Drawing Sheets

| Field | Length(bits) |
|---|---|
| [...] | |
| MIN_SLOT_CYCLE_INDEX_RELEASE | 3 |
| MAX_SLOT_CYCLE_INDEX_RELEASE | 3 |
| SLOT_CYCLE_RELEASE_TIMER | 8 |

| Field | Length |
|---|---|
| [...] | |
| SLOT_CYCLE_INDEX_RELEASE | 4 |
| SLOT_CYCLE_RELEASE_TIMER | 8 |

| Field | Length(Bits) |
|---|---|
| [...] | |
| MIN_SLOT_CYCLE_INDEX_MS | 4 |

FAST CALL SETUP SYSTEM AND METHOD IN A MOBILE COMMUNICATIONS SYSTEM

CROSS-REFERENCE TO RELATED APPLICATIONS

Pursuant to 35 U.S.C. § 119(a), this application claims the benefit of earlier filing date and right of priority to Korean Patent Application Nos. 2003-45354 and 2003-52026 filed on Jul. 4, 2003 and Jul. 28, 2003, respectively, the contents of which are hereby incorporated by reference herein in their entirety.

BACKGROUND OF THE INVENTION

1. Field of the Invention

The present invention relates to a mobile communications system and, more particularly, to a call setup system and method in a mobile communications environment.

2. Discussion of the Related Art

In the world of cellular telecommunications, those skilled in the art often use the terms 1G, 2G, and 3G. The terms refer to the generation of the cellular technology used. 1G refers to the first generation, 2G to the second generation, and 3G to the third generation.

1G is used to refer to the analog phone system, known as an AMPS (Advanced Mobile Phone Service) phone systems. 2G is commonly used to refer to the digital cellular systems that are prevalent throughout the world, and include CDMAOne, Global System for Mobile communications (GSM), and Time Division Multiple Access (TDMA). 2G systems can support a greater number of users in a dense area than can 1G systems.

3G is commonly used to refer to the digital cellular systems currently being developed. Recently, third-generation (3G) CDMA communication systems have been proposed including proposals, such as cdma2000 and W-CDMA. These 3G communication systems are conceptually similar to each other with some significant differences.

A cdma2000 system is a third-generation (3G) wideband, spread spectrum radio interface system which uses the enhanced service potential of CDMA technology to facilitate data capabilities such as Internet and intranet access, multimedia applications, high-speed business transactions, and telemetry. The focus of cdma2000, as is that of other third-generation systems, is on network economy and radio transmission design to overcome the limitations of a finite amount of radio spectrum availability.

FIG. 1 illustrates a wireless communication network 1 architecture.

Referring to FIG. 1, a subscriber uses a mobile terminal 2 to access network services. The mobile terminal may be a portable communications unit, such as a hand-held cellular phone, a communication unit installed in a vehicle, or even a fixed-location communications unit.

The electromagnetic waves from the mobile terminal are transmitted by the Base Transceiver System (BTS) 3 also known as node B. The BTS 3 consists of radio devices such as antennas and equipment for transmitting radio waves. The Base Station Controller (BSC) 4 receives the transmissions from one or more BTS's. The BSC 4 provides control and management of the radio transmissions from each BTS 3 by exchanging messages with the BTS 3 and the Mobile Switching Center (MSC) 5 or Internal IP Network 17. The BTS's and BSC are part of the Base Station (BS) 6.

The BS 6 exchanges messages with and transmits data to a Circuit Switched Core Network (CSCN) 7 and Packet Switched Core Network (PSCN) 8. The CSCN 7 provides traditional voice communications and the PSCN 8 provides Internet applications and multimedia services.

The Mobile Switching Center (MSC) 5 portion of the CSCN 7 provides switching for traditional voice communications to and from an mobile terminal and may store information to support these capabilities. The MSC 5 may be connected to one of more BS's as well as other public networks, for example a Public Switched Telephone Network (PSTN) or Integrated Services Digital Network (ISDN). A Visitor Location Register (VLR) 9 is used to retrieve information for handling voice communications to or from a visiting subscriber. The VLR 9 may be within the MSC and may serve more than one MSC 5.

A user identity is assigned to the Home Location Register (HLR) 10 of the CSCN 7 for record purposes such as subscriber information, for example Electronic Serial Number (ESN), Mobile Directory Number (MDR), Profile Information, Current Location, and Authentication Period. The Authentication Center (AC) 11 manages authentication information related to the mobile terminal. The AC 11 may be within the HLR 10 and may serve more than one HLR 10. The interface between the SC and the HLR/AC is an IS-41 standard interface.

The Packet Data Serving Node (PDSN) 12 portion of the PSCN 8 provides routing for packet data traffic to and from mobile terminal. The PDSN 12 establishes, maintains, and terminates link layer sessions to the mobile terminal's and may interface with one of more BS and one of more PSCN.

The Authentication, Authorization and Accounting (AAA) Server 13 provides Internet Protocol authentication, authorization and accounting functions related to packet data traffic. The Home Agent (HA) 14 provides authentication of MS IP registrations, redirects packet data to an from the Foreign Agent (FA) 15 component of the PDSN 12, and receives provisioning information for users from the AAA. The HA 14 may also establish, maintain, and terminate secure communications to the PDSN and assign a dynamic IP address. The PDSN 12 communicates with the AAA 13, HA 14 and the Internet 16 via an Internal IP Network 17.

FIG. 2 illustrates a data link protocol architecture layer for a wireless network.

Referring to FIG. 2, the upper layer contains three basis services; voice services 62, data services 61 and signaling 70. Voice services 62 include PSTN access, mobile-to-mobile voice services, and Internet telephony. Data services 61 are services that deliver any form of data on behalf of a mobile end user and include packet data applications (e.g., IP service), circuit data applications (e.g., asynchronous fax and B-ISDN emulation services), and SMS. Signaling 70 controls all aspects of mobile operation.

The Link Layer 30, is subdivided into the Link Access Control (LAC) sublayer 32 and the Medium Access Control (MAC) sublayer 31. The link layer provides protocol support and control mechanisms for data transport services and performs the functions necessary to map the data transport needs of the upper levels 60 into specific capabilities and characteristics of the physical layer 20. The Link Layer 30 may be viewed as an interface between the upper layers and the Physical Layer 20.

The separation of MAC 31 and LAC 32 sublayers is motivated by the need to support a wide range of upper layer services, and the requirement to provide for high efficiency and low latency data services over a wide performance range (from 1.2 Kbps to greater than 2 Mbps). Other motivators are the need for supporting high QoS delivery of circuit and packet data services, such as limitations on acceptable delays and/or data BER (bit error rate), and the growing demand for advanced multimedia services each service having a different QoS requirements.

The LAC sublayer 32 is required to provide a reliable, in-sequence delivery transmission control function over a point-to-point radio transmission link 42. The LAC sublayer manages point-to point communication channels between upper layer entities and provides framework to support a wide range of different end-to-end reliable link layer protocols.

The MAC sublayer 31 facilitates complex multimedia, multi-services capabilities of 3G wireless systems with Quality of Service (QoS) management capabilities for each active service. The MAC sublayer 31 provides procedures for controlling the access of data services (packet and circuit) to the physical layer 20, including the contention control between multiple services from a single user, as well as between competing users in the wireless system. The MAC sublayer 31 also provides for reasonably reliable transmission over the radio link layer using a Radio Link Protocol (RLP) 33 for a best-effort level of reliability. Signaling Radio Burst Protocol (SRBP) 35 is an entity that provides connectionless protocol for signaling messages. Multiplexing and Quality of Service (QoS) Control 34 is responsible for enforcement of negotiated QoS levels by mediating conflicting requests from competing services and the appropriate prioritization of access requests.

The Physical Layer 20 is responsible for coding and modulation of data transmitted over the air. The Physical Layer 20 conditions digital data from the higher layers so that the data may be transmitted over a mobile radio channel reliably.

The Physical Layer 20 maps user data and signaling, which are delivered by the MAC sublayer 31 over multiple transport channels, into a physical channels and transmits the information over the radio interface. In the transmit direction, the functions performed by the Physical Layer 20 include channel coding, interleaving, scrambling, spreading and modulation. In the receive direction, the functions are reversed in order to recover the transmitted data at the receiver.

Generally, a mobile terminal communicates traffic data through a synchronous channel. The mobile terminal receives overhead and paging messages for an incoming call over control channels. The mobile terminal then sends a response appropriate for the received page to a corresponding communications network.

A base station transmits the overhead message or page on a common channel such as forward paging channel (F-PCH), forward broadcast control channel (F-BCCH), and forward common control channel (F-CCCH). The overhead message is transmitted on F-PCH or F-BCCH and the paging is transmitted on F-PCH or F-CCCH.

A mobile terminal, when turned on, monitors all slots to receive overhead messages. After having received an overhead message, the mobile terminal can receive a page according to two kinds of modes.

First mode is a non-slotted mode. In the non-slotted mode, the mobile terminal monitors all slots to receive a page. Second mode is slotted mode. In slotted mode, the mobile terminal is turned on at a determined slot to monitor the corresponding slot and to receive a page. The mobile terminal is then turned off in other slots to reduce power consumption.

Whether the mobile terminal operates in non-slotted or slotted mode depends on a station class mask (SCM) value set in the mobile terminal. Generally, a mobile terminal is turned on one slot in advance of the determined slot in preparation of a paging reception. This is because preparation for hardware to normally operate is needed to receive a paging.

When a mobile terminal operates in slotted mode, (i.e., when the mobile terminal receives a page in a specific slot to monitor a corresponding paging slot), the following two situations may arise. First, if the value of the paging slot cycle increases, time during which the mobile terminal is turned on is decreased. This reduces power consumption, however, time taken for the mobile terminal to receive a page is prolonged and call setup is delayed. Second, if the value of the paging slot cycle decreases, the time during which the mobile terminal is turned on is prolonged. This increases the power consumption of the mobile terminal. The time for the mobile terminal to receive the paging is reduced, however, because the time taken for setting up the call is shortened.

A base station sets values of minimum slot cycle index (MIN_SLOT_CYCLE_INDEX) and maximum slot cycle index (MAX_SLOT_CYCLE_INDEX). Accordingly, all mobile terminals in a service domain of a corresponding base station determine a paging slot cycle value using the values of minimum cycle index (MIN_SLOT_CYCLE_INDEX) and maximum slot cycle index (MAX_SLOT_CYCLE_INDEX).

In the slotted mode, the mobile terminal is turned on once each predetermined cycle. Such a cycle is called a paging slot cycle. And, a corresponding slot monitored by the mobile terminal during the corresponding paging slot cycle is called a paging slot (PGSLOT).

The paging slot cycle can be found by Equation 1.

$$C = 16 \times 2^i, -4 \leq i \leq 7 \qquad \text{[Equation 1]}$$

In Equation 1, 'i' is a selected slot cycle index (SLOT_CYCLE_INDEX$_s$). The selected slot cycle index (SLOT_CYCLE_INDEX$_s$) is found by Equation 2 using three kinds of parameters, for example, preferred slot cycle index (SLOT_CYCLE_INDEX$_p$), maximum slot cycle index (MAX_SLOT_CYCLE_INDEX$_s$), and minimum slot cycle index (MIN_SLOT_CYCLE_INDEX$_s$).

$$\text{SLOT\_CYCLE\_INDEXs} = \text{MAX}(\text{MIN\_SLOT\_CYCLE\_INDEX}_s, \text{MIN}(\text{SLOT\_CYCLE\_INDEX}_p, \text{MAX\_SLOT\_CYCLE\_INDEX}_s)) \qquad \text{[Equation 2]}$$

The preferred slot cycle index (SLOT_CYCLE_INDEX$_p$) is a value stored in the mobile terminal and has a preferred value of −4 to 7. The value of the preferred slot cycle index (SLOT_CYCLE_INDEX$_p$) is transmitted to a base station through one or two fields (SLOT_CYCLE_INDEX, SIGN_SLOT_CYCLE_INDEX) in registration message (RGM), Origination message (ORM), page response message (PRM), or terminal information message.

The minimum slot cycle index (MIN_SLOT_CYCLE_INDEX$_s$) has a preferred value of −4 to 0. The maximum slot cycle index (MAX_CYCLE_INDEX$_s$) has a preferred value of 0 to 7. The value of the maximum slot cycle index (MAX_SLOT_CYCLE_INDEX$_s$) is transmitted to the mobile terminal from the base terminal through system parameters message (SPM) or MC-RR parameters message (MCRRPM).

The paging slot (PGSLOT) is found by Hashing using a phone number of the mobile terminal. One corresponding value is selected from the group consisting of 0 to (C−1), where 'C' is the value of paging slot cycle calculated by Equation 1. FIG. 3 illustrates a case where the values of the preferred slot cycle index (SLOT_CYCLE_INDEX$_p$), maximum slot cycle index (MAX_SLOT_CYCLE_INDEX$_s$), minimum slot cycle index (MIN_SLOT_CYCLE_INDEX$_s$), and paging slot (PGSLOT) are 2, −1, 3, and 6, respectively.

Based on Equation 2, the value of the selected slot cycle index (SLOT_CYCLE_INDEX$_s$) is '2'. That is, the value of the selected slot cycle index (SLOT_CYCLE_INDEX$_s$) is max[−1, min(2,3)] which is equal to '2'. Moreover, based on Equation 1, the paging slot cycle becomes 16×2², (i.e., '64' by applying the value '2' of the calculated slot cycle index (SLOT_CYCLE_INDEX$_s$) to 'i').

Slot numbers are repeated from 0 to 2047. Hence, as shown in FIG. 3, because the paging slot cycle is 64 and the paging slot (PGSLOT) is 6, the mobile terminal sequentially monitors the slot numbers 6, 70, 134, and 198.

In the above-explained related art, if the mobile terminal, which previously had a data call that was released, subsequently tries a call access the mobile terminal will have to wait for the duration of the entire cycle. It is necessary to set up separate parameter values to a specific mobile terminal to reduce a time delay for receiving a paging for the call access. This is because it is highly probable that the mobile terminal, which had setup the call that was released, will try to setup a call again.

Currently, all mobile terminals that communicate with the same base station use the same values of the maximum slot cycle index (MAX_SLOT_CYCLE_INDEX$_s$) and minimum slot cycle index (MIN_SLOT_CYCLE_INDEX$_s$). Hence, when a particular mobile terminal tries to setup a call connection with the base station, the time taken for receiving the page from the base station is delayed. Therefore, a fast call setup method and system is needed.

There is a higher probability that a mobile terminal, which recently had a call release, to setup a call again, compared with other mobile terminals attempting to setup a new call. In other words, there is a high probability that a page for connecting a call will be sent to the mobile terminal that has recently released the call.

SUMMARY OF THE INVENTION

Therefore, an object of the present invention is to provide a communication system that allows a mobile terminal, which has recently released a call, to be configured to monitor a page in a shorter or reduced slot cycle after a call release.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a fast call setup method in a mobile communication system comprises monitoring a first channel, such as paging channel or common control channel, on a first predetermined cycle by a mobile terminal, the first channel comprising a plurality of slots for monitoring by the mobile terminal; communicating data between a network and the mobile terminal over a second channel, such as a traffic channel; sending to (or receiving from) the network a first message being sent over a mobile directed channel, wherein the first message is associated with releasing the second channel; and receiving from the network a second message that corresponds to releasing the second channel, and the second message comprising at least a slot cycle parameter for determining a second predetermined cycle for monitoring the first channel by the mobile terminal, so that the mobile terminal monitors the first channel using the second predetermined cycle after releasing the second channel. Preferably, the slot cycle parameter is determined based on whether the mobile terminal is capable of supporting a slot cycle of a predetermined length.

According to one aspect of the invention, the second predetermined cycle is preferably 16×2$^i$, wherein i represents a slot cycle index determined based on the slot cycle parameter. Preferably, the slot cycle index is between −4 to 7.

According to another aspect of the invention, the second message comprises a time parameter for use by the mobile terminal to terminate monitoring of the first channel using the second predetermined cycle upon expiration of time associated with the time parameter.

According to yet another aspect of the invention, the fast call setup method further comprises the mobile terminal transmitting a normal slotted mode message to the network prior to the expiration of time associated with the time parameter to allow the mobile terminal to monitor the first channel according to the first predetermined cycle. Alternatively, the mobile terminal may receive a normal slotted mode message from the network prior to the expiration of time associated with the time parameter to allow the mobile terminal to monitor the first channel according to the first predetermined cycle.

According to one aspect of the invention, the slot cycle parameter received by the mobile terminal comprises an after-release minimum slot cycle index and an after-release maximum slot cycle index, and wherein i is determined by: MAX (after-release minimum slot cycle index, MIN (a preferred slot cycle index provided by the mobile terminal, after-release maximum slot cycle index)). Alternatively, the slot cycle parameter received by the mobile terminal comprises an after-release slot cycle index, wherein i is determined by: MAX (after-release slot cycle index, minimum mobile slot cycle index).

According to one aspect of the invention, the slot cycle parameter received by the mobile terminal comprises the slot cycle index to use after the second channel is released, and mobile terminal having a minimum mobile slot cycle index that can be supported by the mobile terminal, wherein i is determined by MAX (slot cycle index release, minimum mobile slot cycle index release), and the method further comprises transmitting the minimum mobile slot cycle index to the network for determining the second predetermined cycle by the network.

According to another embodiment of the invention, a fast call setup method comprises sending on a first channel a paging information for a mobile terminal, the first channel comprising a plurality of slots for monitoring by the mobile terminal at a first predetermined cycle; communicating data between a network and the mobile terminal over a second channel; receiving from (or sending to) the mobile terminal a first message, wherein the first message is associated with releasing the second channel; and sending to the mobile terminal a second message that corresponds to releasing the second channel, and the second message comprising at least a slot cycle parameter for determining a second predetermined cycle for monitoring the first channel by the mobile terminal, so that the mobile terminal monitors the first channel using the second predetermined cycle after releasing the second channel.

According to one aspect of the invention, the second message comprises a time parameter for use by the mobile terminal to terminate monitoring of the first channel using the second predetermined cycle upon expiration of time associated with the time parameter.

According to another aspect of the invention, the fast call setup method further comprises the network receiving a normal slotted mode message from the mobile terminal prior to the expiration of time associated with the time parameter to allow the mobile terminal to monitor the first channel according to the first predetermined cycle. Alternatively, the network transmits a normal slotted mode message to the mobile terminal prior to the expiration of time associated with the time parameter to allow the mobile terminal to monitor the first channel according to the first predetermined cycle.

According to another embodiment of the invention, during an idle state of the mobile terminal, the fast call setup method comprises monitoring a first channel, such as a paging channel on a first predetermined cycle by a mobile terminal, the first channel comprising a plurality of slots monitored by the mobile terminal; and receiving from the network a first message over a mobile directed channel, wherein the first message comprises at least a slot cycle parameter for determining a second predetermined cycle for monitoring the first channel by the mobile terminal, so that the mobile terminal monitors the first channel using the second predetermined cycle. The slot cycle parameter is described above.

According to one aspect of the invention, the second predetermined cycle is Approximately equal to $16 \times 2^i$, wherein i represents a slot cycle index determined by using the slot cycle parameter. In addition, the first message includes a time parameter for use by the mobile terminal to terminate monitoring of the first channel using the second predetermined cycle upon expiration of time associated with the time parameter.

According to yet another embodiment of the invention, a mobile terminal for communicating with a network to expedite call setup comprises means for monitoring a first channel on a first predetermined cycle by the mobile terminal, the first channel comprising a plurality of slots for monitoring by the mobile terminal; means for communicating data between a network and the mobile terminal over a second channel; means for communicating with the network a first message being sent over a mobile directed channel, wherein the first message is associated with releasing the second channel; and means for receiving from the network a second message that corresponds to releasing the second channel, and the second message comprising at least a slot cycle parameter for determining a second predetermined cycle for monitoring the first channel by the mobile terminal, so that the mobile terminal monitors the first channel using the second predetermined cycle after releasing the second channel.

According to another embodiment of the invention, a network for communicating with a mobile terminal to expedite call setup comprises means for sending over a first channel a paging signal of a first predetermined cycle, the first channel comprises a plurality of slots for monitoring by the mobile terminal; means for communicating data between a network and the mobile terminal over a second channel; and means for communicating with the mobile terminal a first message over a mobile directed channel, wherein the first message corresponds to releasing the second channel, and the first message comprises at least a slot cycle parameter for determining a second predetermined cycle for monitoring the first channel by the mobile terminal, so that the mobile terminal monitors the first channel using the second predetermined cycle after releasing the second channel.

These and other embodiments of the present invention will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments of the system.

DETAILED DESCRIPTION OF THE PREFERRED EMBODIMENTS

Figure 1:
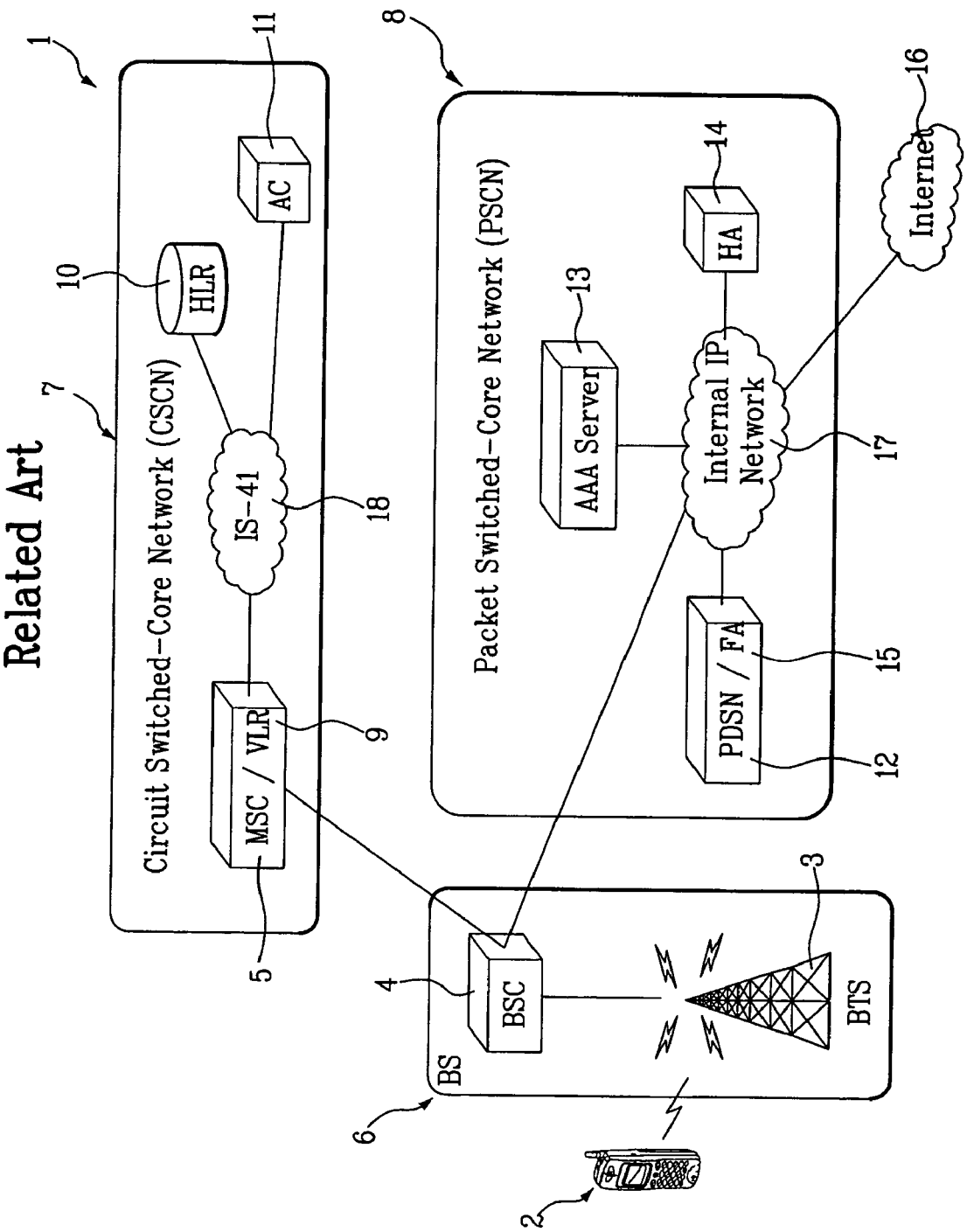
FIG. 1 illustrates a wireless communication network architecture.
Figure 2:
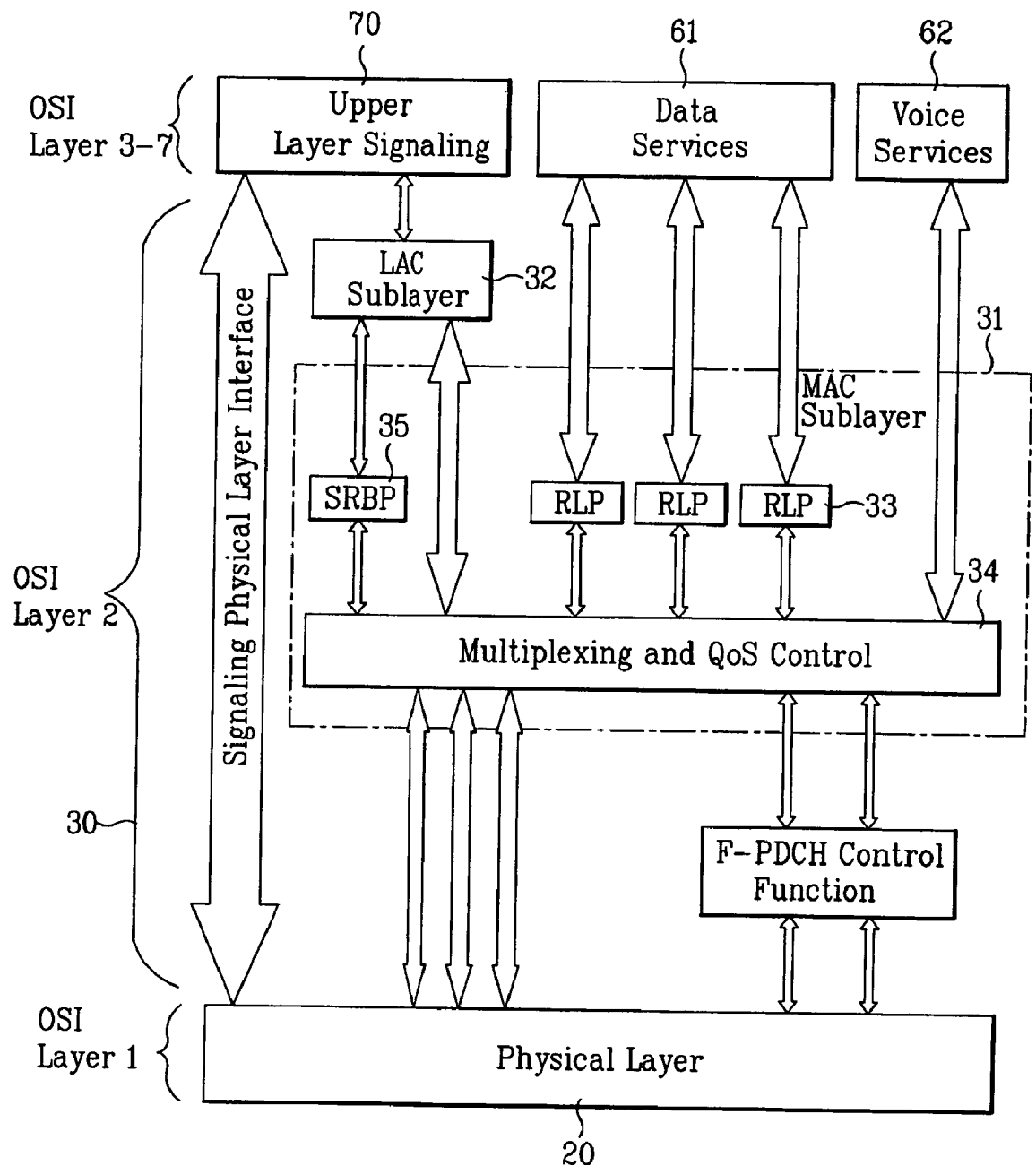
FIG. 2 illustrates a data link protocol architecture layer for a wireless network.

To aid describing the present invention, certain exemplary parameter names, values, lengths and other attributes are being used to describe the channels, messages and fix or variable identifiers communicated between mobile and base stations. It should be noted that such parameter names are for illustration purposes only, and that other names may be used to describe the same or similar function.

To accomplish this, the base station transmits the values of minimum cycle index (MIN_SLOT_CYCLE_INDEX) and maximum slot cycle index (MAX_SLOT_CYCLE_INDEX), and parameters enabling the mobile terminal to determine a paging slot cycle after call release (hereinafter named 'after-release paging slot cycle (paging_slot_cycle_release)'). The base station further transmits after-release minimum cycle index (MIN_SLOT_CYCLE_INDEX_RELEASE) or after-release maximum slot cycle index (MAX_SLOT_CYCLE_INDEX_RELEASE) to the mobile terminal so that the corresponding mobile terminal determines the after-release paging slot cycle (paging_slot_cycle_release) based on the above parameter.

The base station sets the above-listed parameters so that the mobile terminals can adjust a monitoring cycle of the paging slot. The base station then transmits the parameters to the corresponding mobile terminals. In one embodiment, the base station further transmits after-release cycle index (SLOT_CYCLE_INDEX_RELEASE) to the mobile terminal. The after-release cycle index (SLOT_CYCLE_INDEX_RELEASE) is transmitted to the mobile terminal through a release order (RO) (e.g., a message used in releasing a call of a mobile terminal), an enhanced release order (ERO), an extended release message (ERM), or an extended release mini message (ERMM).

The mobile terminal, in another embodiment, further transmits a new parameter for informing a minimum slot cycle length that can be currently supported by the mobile terminal itself. Mobile terminal minimum slot cycle index (MIN_SLOT_CYCLE_INDEX_MS) is transmitted to the base station through one of release order (RO), extended release mini message (ERMM), and extended release response mini message (ERRMM).

The after-release paging slot cycle (paging_slot_cycle_release) can be determined based on said parameter values. The base station, thus, considers the situation of the mobile terminals in its service domain as well as the current system situation to adjust the monitoring cycle of the paging slot of the mobile terminal.

In one embodiment, the mobile terminal provides the base station with the capability of monitoring the paging slot according to its situation. The base station further considers the current capability of the mobile terminal to determine a paging slot monitoring cycle. In one embodiment, the paging slot monitoring cycle is shorter than a previous paging slot monitoring cycle for the released call.

In one embodiment of the present invention, the after-release paging slot cycle (paging_slot_cycle_release) is determined by Equation 3 below. The after-release paging slot cycle (paging_slot_cycle_release) is a paging slot monitoring cycle that will be used by the mobile terminal releasing a data call.

$$C_R = 16 \times 2^i, \quad -4 \leq i \leq 7 \quad \text{[Equation 3]}$$

In Equation 3, 'i' is a slot cycle index selected after call release (hereinafter named 'after-release selected slot cycle index (SLOT_CYCLE_INDEX_RELEASE$_s$)').

The after-release selected slot cycle index (SLOT_CYCLE_INDEX_RELEASE$_s$) is found by Equation 4 below using three parameters: preferred slot cycle index (SLOT_CYCLE_INDEX$_p$), after-release maximum slot cycle index (MAX_SLOT_CYCLE_INDEX_RELEASE$_s$), and after-release minimum slot cycle index (MIN_SLOT_CYCLE_INDEX_RELEASE$_s$).

$$\text{SLOT\_CYCLE\_INDEX\_RELEASE}_s = \max[\text{MIN\_SLOT\_CYCLE\_INDEX\_RELEASE}_s, \min(\text{SLOT\_CYCLE\_INDEX}_p, \text{MAX\_SLOT\_CYCLE\_INDEX\_RELEASE}_s)] \quad \text{[Equation 4]}$$

In one embodiment, if the after-release paging slot cycle (paging_slot_cycle_release) is continuously shortened after call release, power consumption of the mobile terminal increases. A limitation is associated with the operational time for the after-release paging slot cycle (paging_slot_cycle_release), based on new parameters after-release maximum slot cycle index (MAX_SLOT_CYCLE_INDEX_RELEASE$_s$) and after-release minimum slot cycle index (MIN_SLOT_CYCLE_INDEX_RELEASE$_s$)).

Alternatively, the after-release selected slot cycle index (SLOT_CYCLE_INDEX_RELEASE$_s$) is found by Equation 4 using two kinds of parameters for the stored after-release slot cycle index (SLOT_CYCLE_INDEX_RELEASE) and the stored mobile terminal minimum slot cycle index (MIN_SLOT_CYCLE_INDEX_MS). The mobile terminal minimum slot cycle index (MIN_SLOT_CYCLE_INDEX_MS) is a minimum slot cycle length that the mobile terminal currently enables to support.

To calculate the after-release paging slot cycle (paging_slot_cycle_release), the base station uses the mobile terminal minimum slot cycle index (MIN_SLOT_CYCLE_INDEX_MS) received from the mobile terminal and the after-release slot cycle index (SLOT_CYCLE_INDEX_RELEASE) in the base station.

In another embodiment, in case of calculating the after-release paging slot cycle (paging_slot_cycle_release), the mobile terminal uses the after-release slot cycle index (SLOT_CYCLE_INDEX_RELEASE) received from the base station and the mobile terminal minimum slot cycle index (MIN_SLOT_CYCLE_INDEX_MS) stored by the mobile terminal, according to Equation 5.

$$\text{SLOT\_CYCLE\_INDEX\_RELEASE} = \text{MAX}[\text{SLOT\_CYCLE\_INDEX\_RELEASE}, \text{MIN}(\text{SLOT\_CYCLE\_INDEX\_MS})] \quad \text{[Equation 5]}$$

If the after-release paging slot cycle (paging_slot_cycle_release) is continually shortened after call release, power consumption of the mobile terminal increases. However, there is a limitation associated with operational time of using the after-release paging slot cycle (paging_slot_cycle_release).

In one embodiment, the base station further transmits after-release operational time information (SLOT_CYCLE_RELEASE_TIMER) for putting the limitation on the operational time using the after-release paging slot cycle (paging_slot_cycle_release) to the mobile terminal. The after-release operational time information (SLOT_CYCLE_RELEASE_TIMER) is transmitted to the mobile terminal through either the release order (RO), the enhanced release order (ERO), the extended release message (ERM), or the extended release mini message (ERMM), for example.

Upon receiving the after-release operational time information (SLOT_CYCLE_RELEASE_TIMER), the mobile terminal uses the shortened paging slot cycle, i.e., after-release paging slot cycle (paging_slot_cycle_release), until an operational timer expires after the call release. The mobile terminal then uses the value of the minimum slot cycle index (MIN_SLOT_CYCLE_INDEX) and the default paging slot cycle determined using the maximum slot cycle index (MAX_SLOT_CYCLE_INDEX) after the operational timer expires. The default paging slot cycle is a cycle used in the previously established call, for example.

In one embodiment, the mobile terminal determines an operation timer value by Equation 6 below using the after-release operational time information (SLOT_CYCLE_RELEASE_TIMER).

$$\text{TIMER} = 16 \times 2^i, \text{ wherein } i = \text{SLOT\_CYCLE\_RELEASE\_TIMER} \quad \text{[Equation 6]}$$

In determining a value of the after-release operational time information (SLOT_CYCLE_RELEASE_TIMER), the base station sets a corresponding information value to be greater than the after-release maximum slot cycle index (MAX_SLOT_CYCLE_INDEX_RELEASE).

In one embodiment, if the value of the after-release operational time information (SLOT_CYCLE_RELEASE_TIMER) is '0', the operational timer can be set to $\infty$ (infinity). In such a case, the mobile terminal keeps using the after-release paging slot cycle (paging_slot_cycle_release) as a cycle after the call release to monitor the paging slot.

Explained in the following are examples that the base station transmits new parameters (MIN_SLOT_CYCLE_INDEX_RELEASE, MAX_SLOT_CYCLE_INDEX_RELEASE) and the after-release operational time information (SLOT_CYCLE_RELEASE_TIMER), which are used in determining the after-release paging slot cycle (paging_slot_cycle_release) after the call release, to the mobile terminal.

A base station preferably transmits parameters (MIN_SLOT_CYCLE_INDEX_RELEASE, MAX_SLOT_CYCLE_INDEX_RELEASE, SLOT_CYCLE_RELEASE_TIMER), which are used in determining the after-release paging slot cycle (paging_slot_cycle_release) after call release, to a mobile terminal through one of system parameters message (SPM), MC-RR parameters message (MCR-RPM), or in-traffic system parameters message (ITSPM), for example.

The mobile terminal receives and stores the parameters. The mobile terminal, after releasing a call, determines the after-release paging slot cycle (paging_slot_cycle_release) using the stored parameters. The mobile terminal monitors the paging slot by the determined after-release paging slot cycle (paging_slot_cycle_release) as a cycle until the operational timer determined by the after-release operational time information (SLOT_CYCLE_RELEASE_TIMER) expires.

Figures 3, 4:
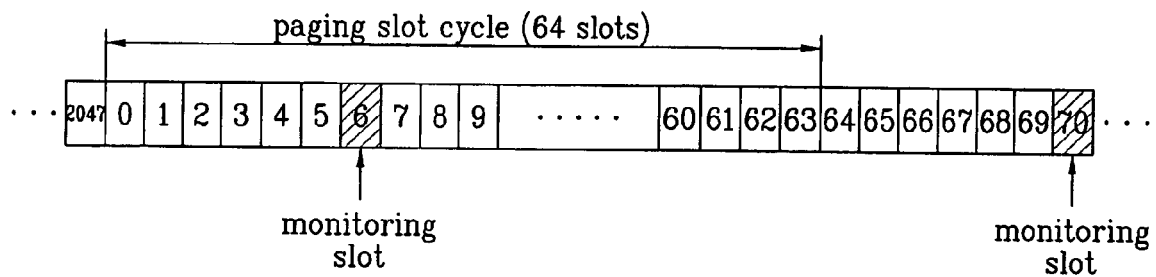
FIG. 3 illustrates a slot timeline to show a paging slot cycle and monitoring of specific slots based on a regular paging slot cycle.
FIG. 4 illustrates a message format for transmitting parameters used in determining an after-release paging slot cycle (paging_slot_cycle_release) according to one embodiment of the present invention.

Referring to FIG. 4, three bits are preferably used for each of the after-release maximum slot cycle index (MAX_SLOT_CYCLE_INDEX_RELEASE) and the after-release minimum slot cycle index (MIN_SLOT_CYCLE_INDEX_RELEASE)), and eight bits are used for the after-release operational time information (SLOT_CYCLE_RELEASE_TIMER).

As such, a base station transmits to mobile terminal parameters used in determining the after-release paging slot cycle. The mobile terminal receives and stores the parameters and determines the after-release paging slot cycle based on the received parameters. The mobile terminal monitors the paging slot by the determined after-release paging slot cycle as a cycle until the operational timer determined by the after-release operational time information expires.

The mobile terminal monitors the paging slot to receive a paging from the base station. In one embodiment, the each message for RO, ERO, ERM, and ERMM has the format shown in FIG. 4, for example. Explained in the following is an exemplary process for determining after-release paging slot cycle for a fast call setup.

If values of the preferred slot cycle index (SLOT_CYCLE_INDEX$_p$), minimum slot cycle index (MIN_SLOT_CYCLE_INDEX$_s$), maximum slot cycle index (MAX_SLOT_CYCLE_INDEX$_s$), after-release minimum slot cycle index (MIN_SLOT_CYCLE_INDEX_RELEASE$_s$), and after-release maximum slot cycle index (MAX_SLOT_CYCLE_INDEX_RELEASE$_s$) are 3, −1, 2, −1, and 1, respectively, the selected slot cycle index (SLOT_CYCLE_INDEX$_s$) used in determining the paging slot cycle of the default used before the call of the mobile terminal is connected becomes '2' based on max[−1, min(2,3)] by inserting the respective values 3, −1, and 2 in Equation 2 for example.

Under the normal slotted mode, the paging slot cycle becomes $16 \times 2^2$, i.e., '64' by applying the value '2' of the calculated selected slot cycle index (SLOT_CYCLE_INDEX$_s$) to 'i' of Equation 1.

Under the reduced slotted mode, the after-release selected slot cycle index (SLOT_CYCLE_INDEX_RELEASE$_s$), which is used in determining the after-release paging slot cycle (paging_slot_cycle_release) used after the connected call has been released, becomes max[−1, min(3,1)]=1 by inserting the respective values of the preferred slot cycle index (SLOT_CYCLE_INDEX$_p$), after-release minimum slot cycle index (MIN_SLOT_CYCLE_INDEX_RELEASE$_s$), and after-release maximum slot cycle index (MAX_SLOT_CYCLE_INDEX_RELEASE$_s$) in Equation 4, for example.

For example, the paging slot cycle becomes $16 \times 2^1$, i.e., '32' by applying the value '1' of the calculated after-release selected slot cycle index (SLOT_CYCLE_INDEX_RELEASE$_s$) to 'i' of Equation 1. The mobile terminal, as shown in FIG. 3, monitors the paging slot each 64 slots before the call is connected. Howwever, after the call is released, the mobile terminal, as shown in FIG. 5, monitors the paging slot each 32 slots until the operational timer determined by the after-release operational time information (SLOT_CYCLE_RELEASE_TIMER) expires.

Figures 5, 6, 7:
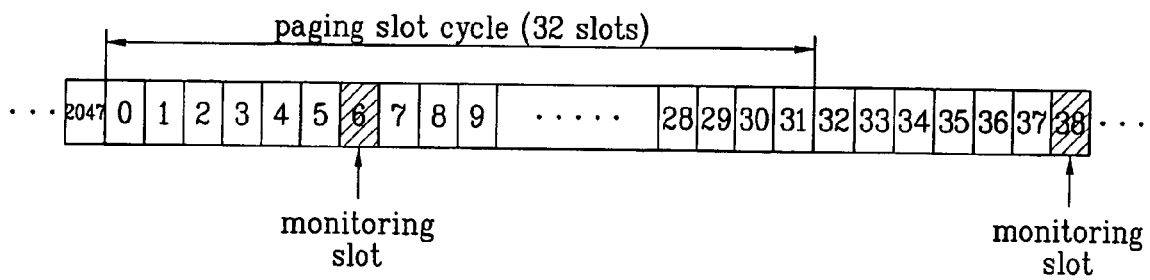
FIG. 5 illustrates a slot timeline to show an after-release paging slot cycle (paging_slot_cycle_release) value and monitoring of specific slots based on a reduced paging slot cycle according to a preferred embodiment of the present invention.
FIG. 6 illustrates an exemplary message format from a network to a mobile terminal for providing after-release slot cycle parameters for determining an after-release paging slot cycle (paging_slot_cycle_release) according to another embodiment of the present invention.
FIG. 7 illustrates an exemplary message format from a mobile terminal to a network for providing after-release slot cycle parameters based on the capability supportable by the mobile terminal.

FIG. 5 is a diagram of a process of calculating an after-release selected slot cycle index value and an after-release paging slot cycle (paging_slot_cycle_release) value and determining a slot to be monitored from the calculated values according to the present invention, in which a mobile terminal monitors a paging slot each 32 slots in case of receiving a paging in slotted mode, if values of the paging slot (PGSLOT) found by Hashing using a phone number of the mobile terminal, preferred slot cycle index (SLOT_CYCLE_INDEX$_p$), after-release minimum slot cycle index (MIN_SLOT_CYCLE_INDEX_RELEASE$_s$), and after-release maximum slot cycle index (MAX_SLOT_CYCLE_INDEX_RELEASE$_s$) are 6, 3, −1, and 1, respectively.

The value of the paging slot (PGSLOT) is determined as one of 0 to (C−1), where 'C' is a value of the paging slot cycle calculated by Equation 3. When the number of the paging slot is repeated from 0 to 2047, the paging slot cycle, as shown in FIG. 5, is 32 and the paging slot (PGSLOT) is 6, for example. Hence, the mobile terminal sequentially monitors the slot numbers 6, (6+32), (6+32+32), (6+32+32+32), etc.

FIG. 6 and FIG. 7 are diagrams of a message format for transmitting parameters used in determining an after-release paging slot cycle (paging_slot_cycle_release) according to the present invention. FIG. 6 illustrates an exemplary message format for the release order (RO), the enhanced release order (ERO), the extended release message (ERM), or the extended release mini message (ERMM). FIG. 7 illustrates an exemplary message format for the release order (RO), the extended release mini message (ERMM), or the extended release response mini message (ERRMM). Other messages may also be used to transmit the parameters noted above without deviating the gist of the present invention.

Referring to FIG. 6, in order to support the present invention, the new fields or parameters for the after-release slot cycle index (SLOT_CYCLE_INDEX_RELEASE) and the after-release operational time information (SLOT_CYCLE_RELEASE_TIMER) are added to the message format illustrated (e.g., RO, ERO, ERM, ERMM). A field for the mobile terminal minimum slot cycle index (MIN_SLOT_CYCLE_INDEX_MS) is included to the message format in FIG. 7.

In the following are examples of new parameters, i.e., the mobile terminal minimum slot cycle index (MIN_SLOT_CYCLE_INDEX_MS), the after-release slot cycle index (SLOT_CYCLE_INDEX_RELEASE), and the after-release operational time information (SLOT_CYCLE_RELEASE_TIMER), which are used in determining the after-release paging slot cycle (paging_slot_cycle_release) after the call release, are transferred between the base station and the mobile terminal. Besides, an example that the mobile terminal or base station uses the normal slotted mode order is explained as well.

Figure 9:
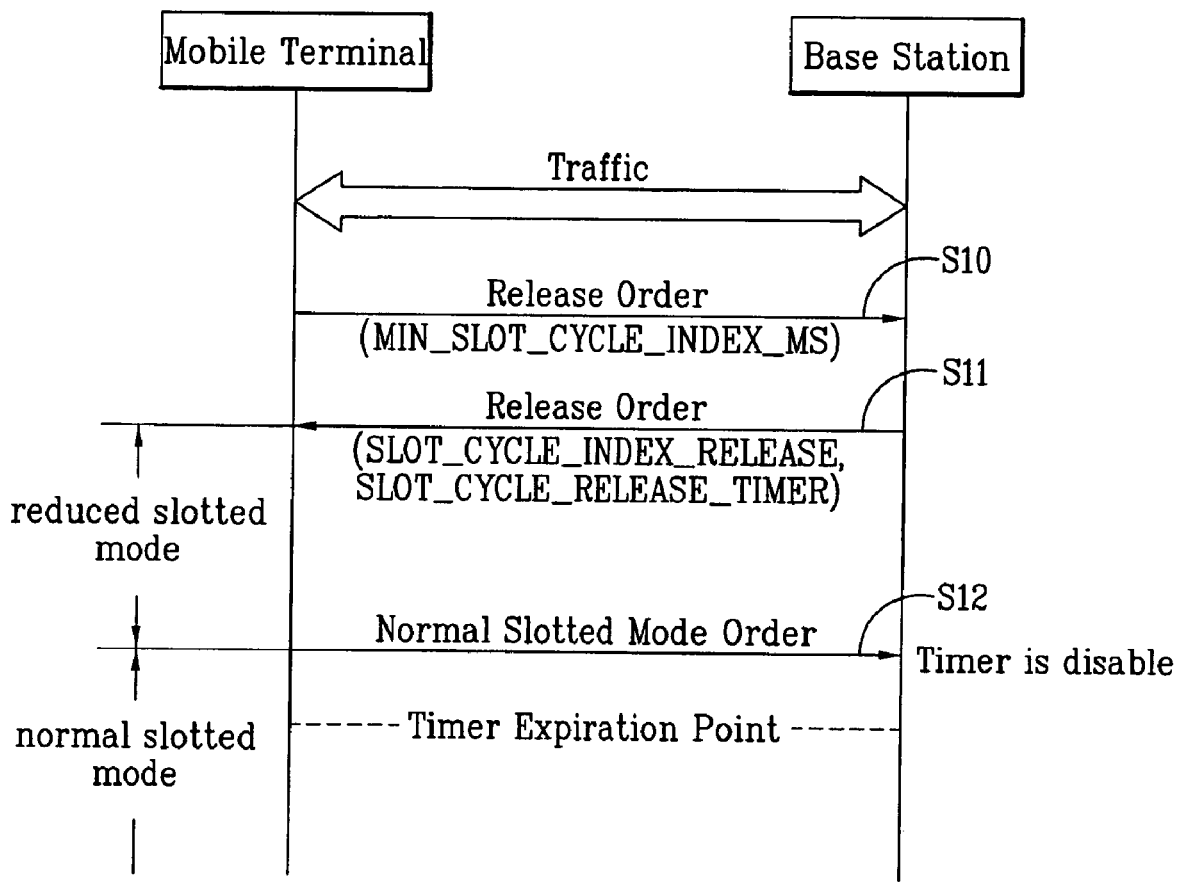
Figure 10:
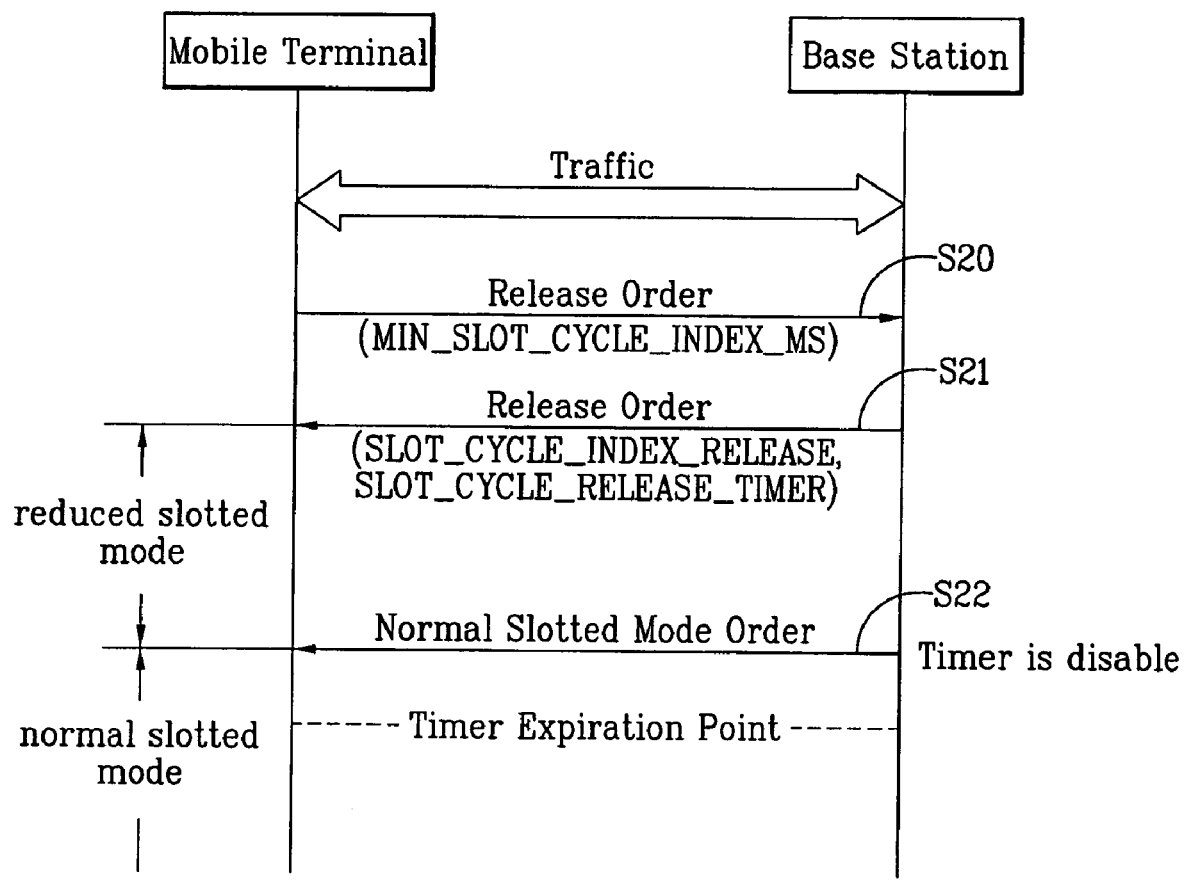
Figure 11:
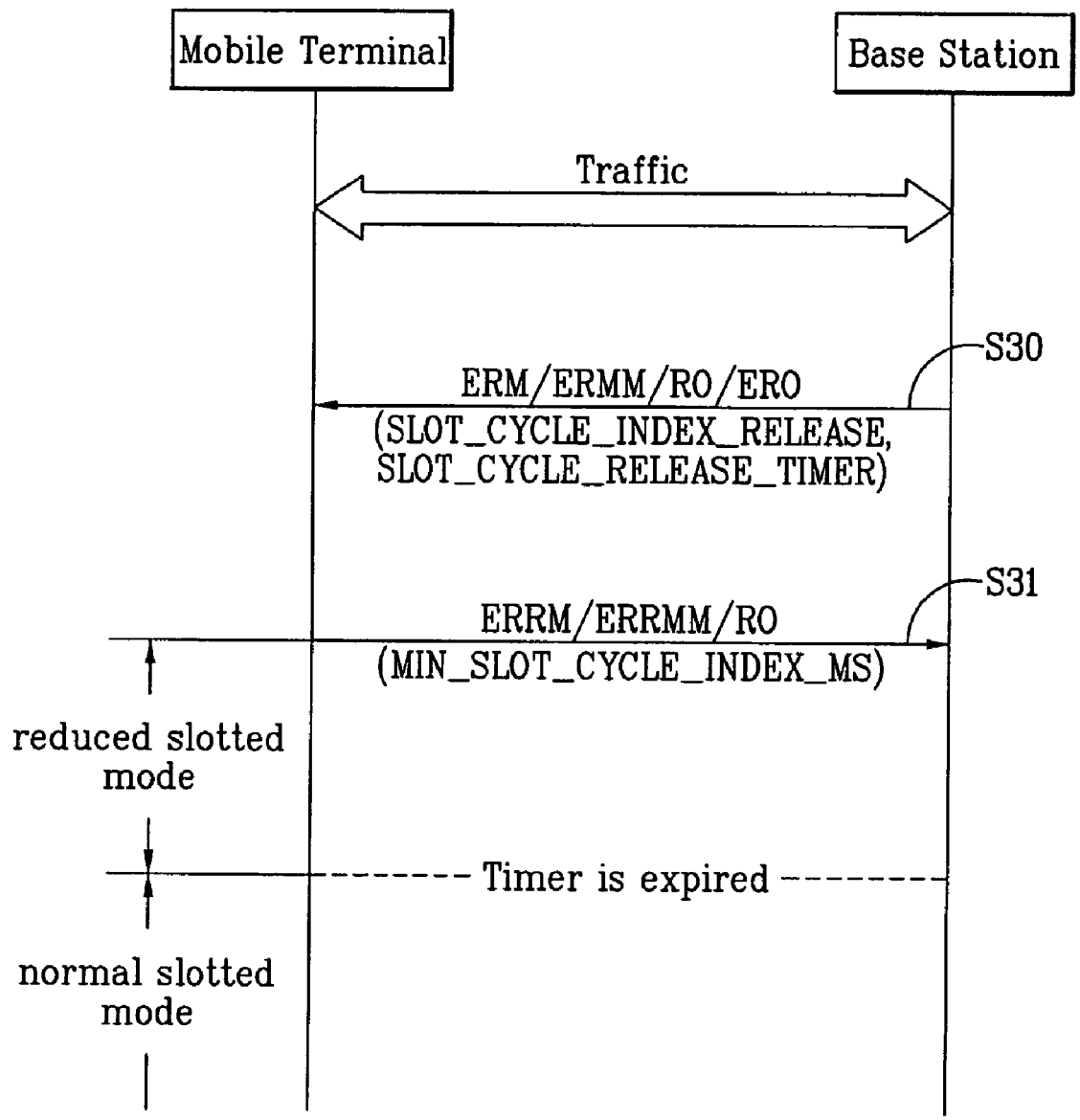
Figure 12:
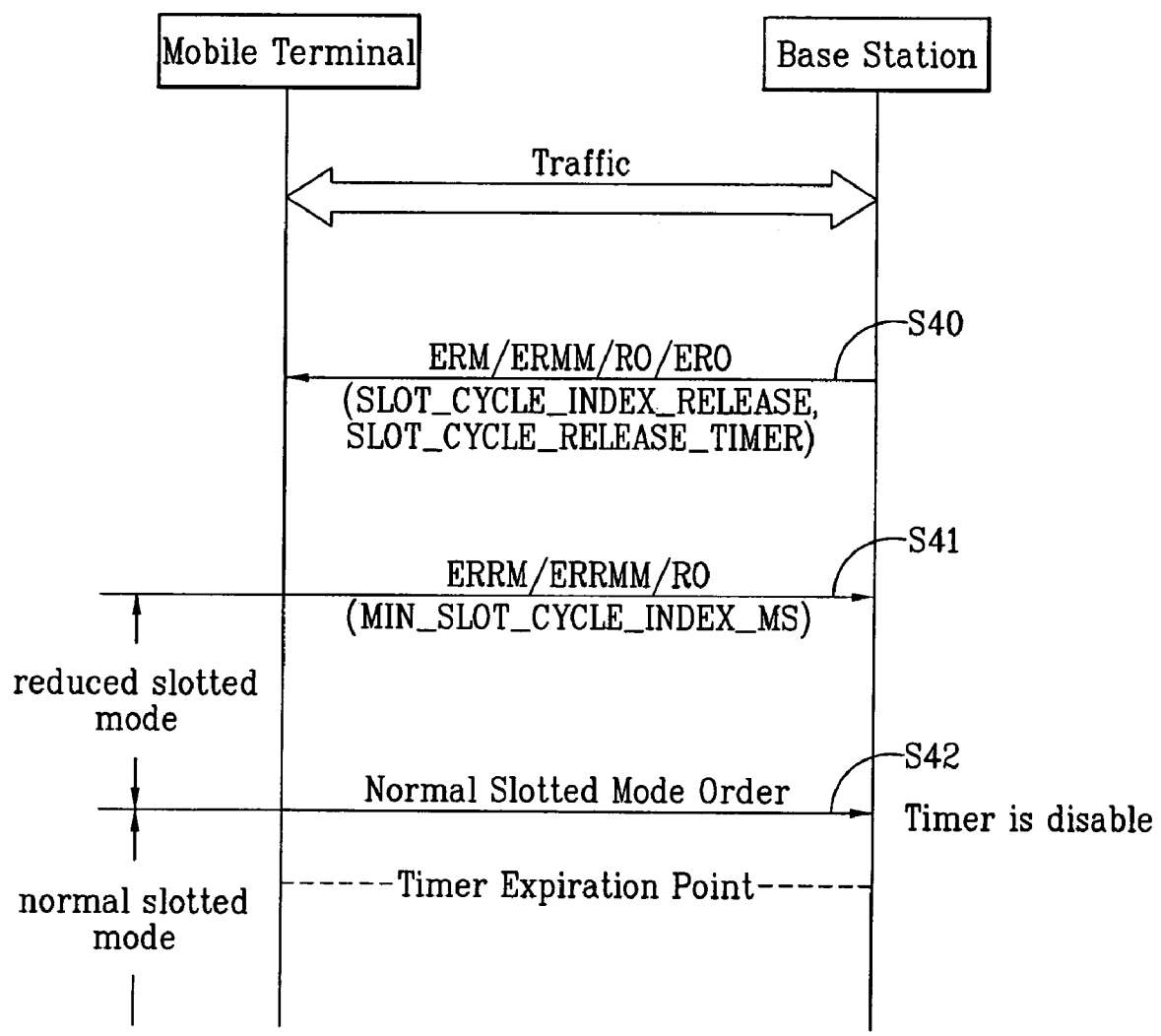
Figure 13:
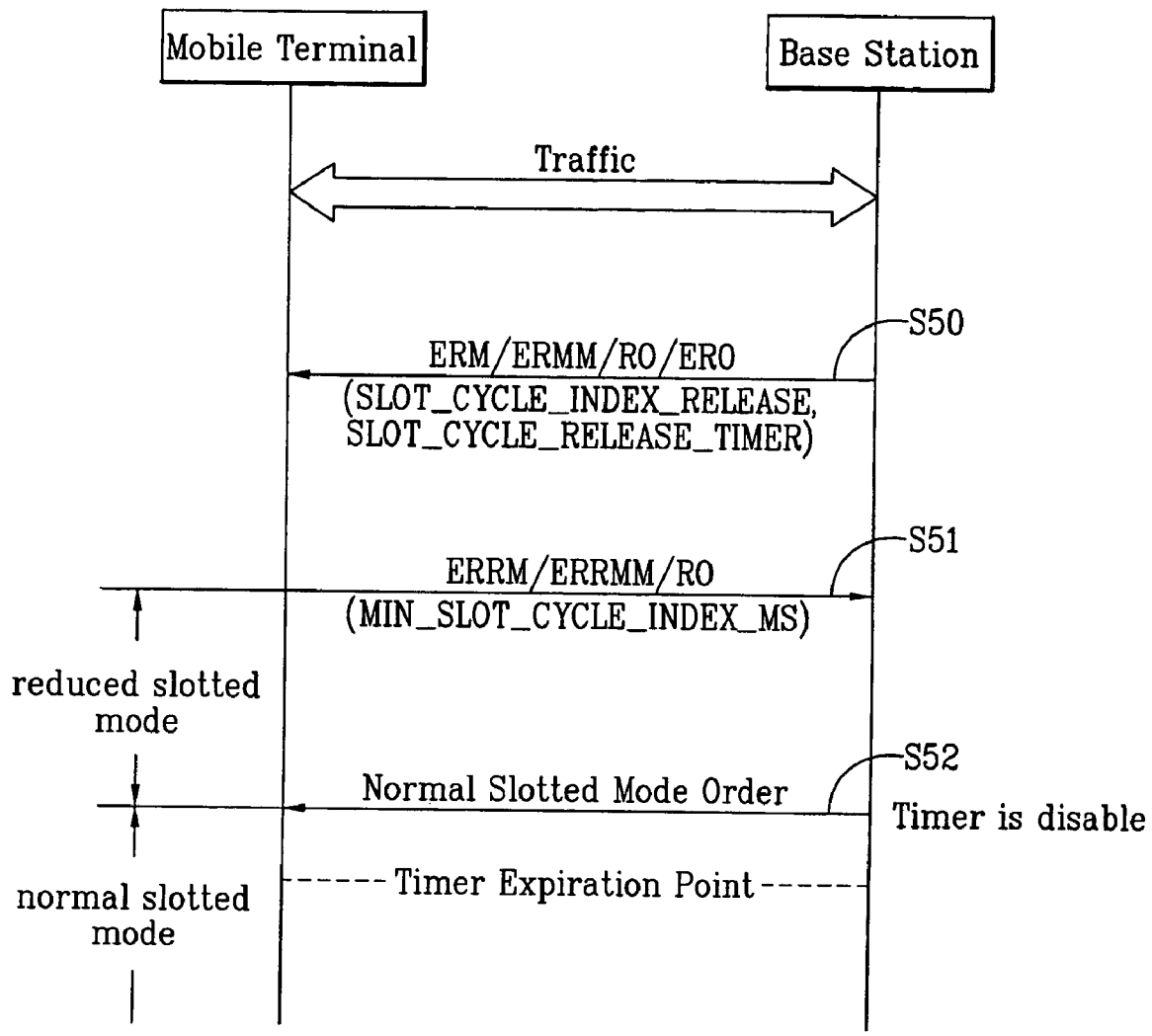

Referring to FIGS. 8 to 13, the mobile terminal of the present invention sends the mobile terminal minimum slot cycle index (MIN_SLOT_CYCLE_INDEX_MS) to inform the base station of a minimum slot cycle length that the mobile terminal itself can currently support. The base station transfers the after-release slot cycle index (SLOT_CYCLE_INDEX_RELEASE) and the after-release operational time information (SLOT_CYCLE_RELEASE_TIMER) to a mobile terminal with a released call to set the paging slot cycle length of the corresponding mobile terminal to be shorter. As shown in FIGS. 11 to 13, the mobile terminal minimum slot cycle index (MIN_SLOT_CYCLE_INDEX_MS) may be transmitted to the base station after the after-release slot cycle index (SLOT_CYCLE_INDEX_RELEASE) and the after-release operational time information (SLOT_CYCLE_RELEASE_TIMER) have been transmitted.

In the following description, the after-release selected slot cycle index (SLOT_CYCLE_INDEX_RELEASE$_s$) calculated by Equation 5 is called 'reduced slot cycle index'. A mode which utilizes the after-release paging slot cycle (paging_slot_cycle_release) calculated by Equation 3 using the reduced slot cycle index, is called 'reduced slotted mode'. The mobile terminal operating in the reduced slotted mode monitors the paging slot by a shorter cycle.

In one embodiment of the present invention, if the operational timer expires or the normal slotted mode order is used, the mobile terminal stops operating in the reduced slotted mode and then operates in the normal slotted mode.

During the normal slotted mode, the mobile terminal determines the paging slot cycle value using the values of the minimum and maximum slot cycle indexes (MIN_SLOT_CYCLE_INDEX, MAX_SLOT_CYCLE_INDEX) equal to those of other mobile terminals belonging to the base station, and then monitors the paging slot using the determined value as a cycle.

Figure 8:
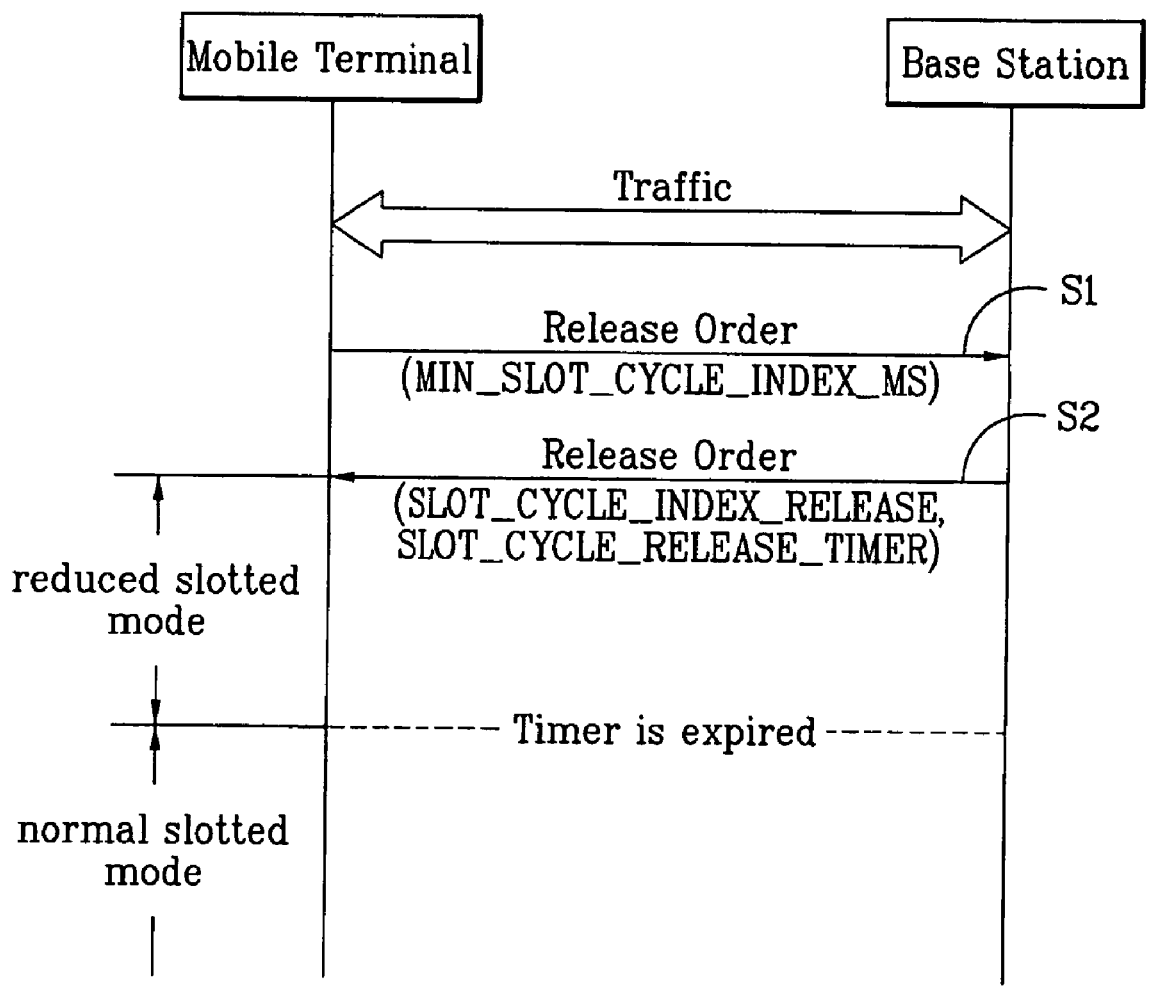
FIGS. 8 to 13 are diagrams of a fast call setup procedure according to various embodiments of the present invention.

Referring to FIG. 8, the mobile terminal is transmitting/receiving data to/from the base station as a data call is connected. Such data or signal traffic is transmitted/received using a traffic channel formed between the mobile terminal and the base station.

Referring to FIG. 8, in case of requesting a call release by the mobile terminal, the mobile terminal preferably transmits the release order message (RO) to the base station to request the call release. In this case, the mobile terminal includes a parameter (MIN_SLOT_CYCLE_INDEX_MS) indicating a minimum slot cycle length currently supportable by the mobile terminal to the release order message (RO) and then transmits the release order message (RO) to the base station (S1).

Upon receiving the release order message (RO) from the mobile terminal, the base station transmits a counterpart (or reply) release order message (RO) for allowing the call release to the mobile terminal. In this case, the base station includes the parameters associated with the after-release paging slot cycle (paging_slot_cycle_release) in the release order message (RO) sent to the mobile terminal. One such parameter comprises a field (SLOT_CYCLE_INDEX_RELEASE).

Preferably, the base station also includes (SLOT_CYCLE_INDEX_RELEASE_TIMER) to the release order message (RO) and transmits to the mobile terminal (S2). That is, the base station transfers the new parameter 'SLOT_CYCLE_INDEX_RELEASE' to be used in determining the after-release paging slot cycle (paging_slot_cycle_release) and another new parameter 'SLOT_CYCLE_INDEX_RELEASE_TIMER' to be used in limiting the operational time using the after-release paging slot cycle (paging_slot_cycle_release) to the mobile terminal through the release order message (RO).

The mobile terminal having received the release order message (RO) from the base station calculates the reduced slot cycle index based on Equation 5, and then calculates the after-release paging slot cycle (paging_slot_cycle_release) using the calculated reduced slot cycle index as a value of 'i' in Equation 3. Consequently, the mobile terminal operates in the reduced slotted mode for monitoring the paging with the after-release paging slot cycle (paging_slot_cycle_release) calculated using the reduced slot cycle index.

In one embodiment, the mobile terminal monitors the paging slot for a page using the calculated after-release paging slot cycle (paging_slot_cycle_release) as a slot cycle until the operation timer determined by the after-release operational time information (SLOT_CYCLE_RELEASE_TIMER) expires.

If the operational timer expires later, the mobile terminal determines the paging slot cycle value using the values of the minimum and maximum slot cycle indexes (MIN_SLOT_CYCLE_INDEX, MAX_SLOT_CYCLE_INDEX) equal to those of other mobile terminals in the base station, and operates in the normal slotted mode for monitoring the paging signal. The mobile terminal monitors the paging slot by taking the paging slot cycle calculated using Equation 1 and Equation 2 as a cycle, for example.

FIG. 9 illustrates an embodiment wherein the normal slotted mode is requested by the mobile terminal and is entered prior to the expiration of the reduced slotted mode. The procedure for entering the reduced slotted mode is similar to that shown in FIG. 8, and thus will not be repeated here.

According to FIG. 9, the mobile terminal having received the release order message (RO) from the base station calculates the reduced slot cycle index using Equation 5, and then calculates the after-release paging slot cycle (paging_slot_cycle_release) using the calculated reduced slot cycle index as a value of 'i' in Equation 3.

The mobile terminal operates in the reduced slotted mode for monitoring the paging signal with the after-release paging slot cycle (paging_slot_cycle_release) calculated using the reduced slot cycle index. If the mobile terminal transmits the normal slotted mode order to stop the operation of the reduced slotted mode before expiration of the operational timer, the operating timer is disabled (S12), and the normal slotted mode is entered by the mobile terminal and the base station.

Upon entering the normal slotted mode, the mobile terminal monitors the paging by the paging slot cycle calculated using the values of the minimum and maximum slot cycle indexes (MIN_SLOT_CYCLE_INDEX, MAX_CYCLE_INDEX) equal to those of other mobile terminals in the base station.

FIG. 10 illustrates an embodiment wherein the normal slotted mode is requested by the base station and is entered prior to the expiration of the reduced slotted mode. The procedure for entering the reduced slotted mode is similar to that shown in FIG. 8, and thus will not be repeated here.

According to FIG. 10, the mobile terminal having received the release order message (RO) from the base station calculates the reduced slot cycle index using Equation 5, and then calculates the after-release paging slot cycle (paging_slot_cycle_release) using the calculated reduced slot cycle index as a value of 'i' in Equation 3.

The mobile terminal operates in the reduced slotted mode for monitoring the paging signal with the after-release paging slot cycle (paging_slot_cycle_release) calculated using the reduced slot cycle index. If the base station transmits the normal slotted mode order to stop the operation of the reduced slotted mode before expiration of the operational timer, the operating timer is disabled (S12), and the normal slotted mode is entered by the mobile terminal and the base station.

Upon entering the normal slotted mode, the mobile terminal monitors the paging by the paging slot cycle calculated using the values of the minimum and maximum slot cycle indexes (MIN_SLOT_CYCLE_INDEX, MAX_SLOT_CYCLE_INDEX) equal to those of other mobile terminals in the base station.

Referring to FIG. 11, when requesting a call release by the base station, the base station preferably requests the call release by transmitting one of the release order message (RO), enhanced release order message (ERO), extended release message (ERM), and extended release mini message (ERMM). The base station includes the parameters associated with the after-release paging slot cycle (paging_slot_cycle_release) in the RO, ERO, ERM, or ERMM message sent to the mobile terminal. One such parameter comprises a field (SLOT_CYCLE_INDEX_RELEASE).

Preferably, the base station also includes (SLOT_CYCLE_INDEX_RELEASE_TIMER) to the RO, ERO, ERM, or ERMM message and transmits to the mobile terminal (S30). That is, the base station transfers the new parameter 'SLOT_CYCLE_INDEX_RELEASE' to be used in determining the after-release paging slot cycle (paging_slot_cycle_release) and another new parameter 'SLOT_CYCLE_INDEX_RELEASE_TIMER' to be used in limiting the operational time using the after-release paging slot cycle (paging_slot_cycle_release) to the mobile terminal through the RO, ERO, ERM, or ERMM message.

Having received the message (one of the RO, ERO, ERM, and ERMM) requesting the call release, the mobile terminal transmits one of release order message (RO), extended release response message (ERRM), on extended release response mini message (ERRMM), for example, to allow the call release. The mobile terminal preferably includes a parameter (MIN_SLOT_CYCLE_INDEX_MS) indicating a minimum slot cycle length currently supportable by the mobile terminal in one of the RO, ERRM, ERRMM used for allowing the call release and then transmits the corresponding message to the base station (S31).

Having transmitted the release message (e.g., one of RO, ERRM, ERRMM), the mobile terminal calculates the reduced slot cycle index using Equation 5, and then calculates the after-release paging slot cycle (paging_slot_cycle_release) using the calculated reduced slot cycle index as a value of 'i' in Equation 3. In one embodiment, the mobile terminal operates in the reduced slotted mode for monitoring the paging with the after-release paging slot cycle (paging_slot_cycle_release) calculated using the reduced slot cycle index. The mobile terminal monitors the paging slot by the calculated after-release paging slot cycle (paging_slot_cycle_release) as a cycle until the operation timer determined by the after-release operational time information (SLOT_CYCLE_RELEASE_TIMER) expires. The mobile terminal monitors the paging slot to receive the paging.

If the operational timer expires later, the mobile terminal determines the paging slot cycle value using the values of the minimum and maximum slot cycle indexes (MIN_SLOT_CYCLE_INDEX, MAX_SLOT_CYCLE_INDEX) equal to those of other mobile terminals in the base station, and operates in the normal slotted mode for monitoring the paging signal. The mobile terminal monitors the paging slot by taking the paging slot cycle calculated using Equation 1 and Equation 2 as a cycle, for example.

FIG. 12 illustrates an embodiment wherein the normal slotted mode is requested by the mobile terminal and is entered prior to the expiration of the reduced slotted mode. The procedure for entering the reduced slotted mode is similar to that shown in FIG. 11, and thus will not be repeated here.

According to FIG. 12, the mobile terminal having transmitted the message (one of RO, ERRM, or ERRMM) allowing the call release (S41), the mobile terminal calculates the reduced slot cycle index using Equation 5, and then calculates the after-release paging slot cycle (paging_slot_cycle_release) using the calculated reduced slot cycle index as a value of 'i' in Equation 3.

The mobile terminal operates in the reduced slotted mode for monitoring the paging with the after-release paging slot cycle (paging_slot_cycle_release) calculated using the reduced slot cycle index. If the mobile terminal transmits the normal slotted mode order to stop the operation of the reduced slotted mode before expiration of the operational timer, the operating timer is disabled (S42), and the normal slotted mode is entered by the mobile terminal and the base station.

Upon entering the normal slotted mode, the mobile terminal monitors the paging by the paging slot cycle calculated using the values of the minimum and maximum slot cycle indexes (MIN_SLOT_CYCLE_INDEX, MAX_SLOT_CYCLE_INDEX) equal to those of other mobile terminals in the base station.

FIG. 13 illustrates an embodiment wherein the normal slotted mode is requested by the base station and is entered prior to the expiration of the reduced slotted mode. The procedure for entering the reduced slotted mode is similar to that shown in FIG. 11, and thus will not be repeated here.

According to FIG. 13, the mobile terminal having transmitted the message (one of RO, ERRM, or ERRMM) allowing the call release (S51), the mobile terminal calculates the reduced slot cycle index using Equation 5, and then calculates the after-release paging slot cycle (paging_slot_cycle_release) using the calculated reduced slot cycle index as a value of 'i' in Equation 3.

The mobile terminal operates in the reduced slotted mode for monitoring the paging with the after-release paging slot cycle (paging_slot_cycle_release) calculated using the reduced slot cycle index. If the base station transmits the normal slotted mode order to stop the operation of the reduced slotted mode before expiration of the operational timer, the operating timer is disabled (S52), and the normal slotted mode is entered by the mobile terminal and the base station.

Upon entering the normal slotted mode, the mobile terminal monitors the paging by the paging slot cycle calculated using the values of the minimum and maximum slot cycle indexes (MIN_SLOT_CYCLE_INDEX, MAX_SLOT_CYCLE_INDEX) equal to those of other mobile terminals in the base station.

Figure 14:
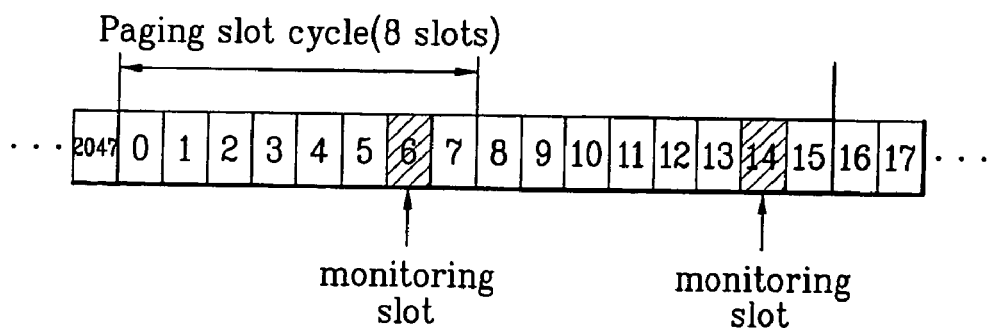
FIG. 14 is a diagram of a process of determining a slot to be monitored, in accordance with one embodiment of the present invention.

FIG. 14 illustrates an example where the reduced paging slot cycle is 8. For example, if values of the preferred slot cycle index (SLOT_CYCLE_INDEX$_p$), minimum slot cycle index (MIN_SLOT_CYCLE_INDEX$_s$), maximum slot cycle index (MAX_SLOT_CYCLE_INDEX$_s$), after-release slot cycle index provided by the base station (SLOT_CYCLE_INDEX_RELEASE), and mobile terminal minimum slot cycle index (MIN_SLOT_CYCLE_INDEX_MS) are 3, −1, 2, −1 and −3, respectively, the selected slot cycle index (SLOT_CYCLE_INDEX$_s$) used in determining the paging slot cycle of the default used before the call of the mobile terminal is connected becomes '2' based on max[2, min(3, −1)] by inserting the respective values 3, −1, and 2.

The paging slot cycle becomes $16 \times 2^2$, i.e., '64' by applying the value '2' of the calculated selected slot cycle index (SLOT_CYCLE_INDEX$_s$) to 'i' of Equation 1. The after-release selected slot cycle index (SLOT_CYCLE_INDEX_RELEASE$_s$), which is used in determining the after-release paging slot cycle (paging_slot_cycle_release) used after the connected call has been released, becomes max(−1,−3)]=−1 by inserting the respective values, −1 and −3 of the after-release slot cycle index (SLOT_CYCLE_INDEX_RELEASE) and mobile terminal minimum slot cycle index (MIN_SLOT_CYCLE_INDEX_MS) in Equation 5.

The paging slot cycle becomes $16 \times 2^{-1}$, i.e., '8' by applying the value '−1' of the calculated after-release selected slot cycle index (SLOT_CYCLE_INDEX_RELEASE$_s$) to 'i' of Equation 3. The mobile terminal, as shown in FIG. 3, monitors the paging slot, every 64 slots before the call is released. After the call is released, the mobile terminal, as shown in FIG. 14, monitors the paging slot every 8 slots until the operational timer determined by the after-release operational time information (SLOT_CYCLE_RELEASE_TIMER) expires.

Although the above descriptions provide how the present invention is practiced after a call is released, the present invention may also be used when the mobile terminal is in an idle state. In other words, the reduced slot cycle mode may be used even when there was no established traffic channel between the mobile terminal and the base station.

During the idle mode, the reduced slot cycle mode may be initiated by either the base station or the mobile terminal. When it is the base station initiated reduced slot cycle mode, the base station preferably uses a forward common signaling logical channel, preferably a mode transition order (MTO) message, that contains the slot cycle index (SLOT_CYCLE_INDEX_RELEASE) and the operational time information (SLOT_CYCLE_RELEASE_TIMER). In response, the mobile terminal, preferably using a reverse common signaling logical channel, transmits the mobile terminal minimum slot cycle index (MIN_SLOT_CYCLE_INDEX_MS) to the base station. Using the above parameters during the idle mode, the mobile terminal and the base station enter the reduced slot cycle mode as described with respect to FIGS. 8 to 13.

Accordingly, in the present invention,. the base station provides a specific mobile terminal with additional parameters to set a length of the paging slot cycle to be shorter than that of other mobile terminals, whereby the time delay taken for the call-released mobile terminal to receive the paging for resetting a call is reduced. Therefore, the present invention enables the fast call setup.

The present invention allows the reduced slotted mode for monitoring the paging from the base station to improve the overall system performance. If operation in the reduced slotted mode is unnecessary before the expiration of the operational time corresponding to the reduced slotted mode, the normal slotted mode order is used to improve the performance of the base station system.

Figure 15:
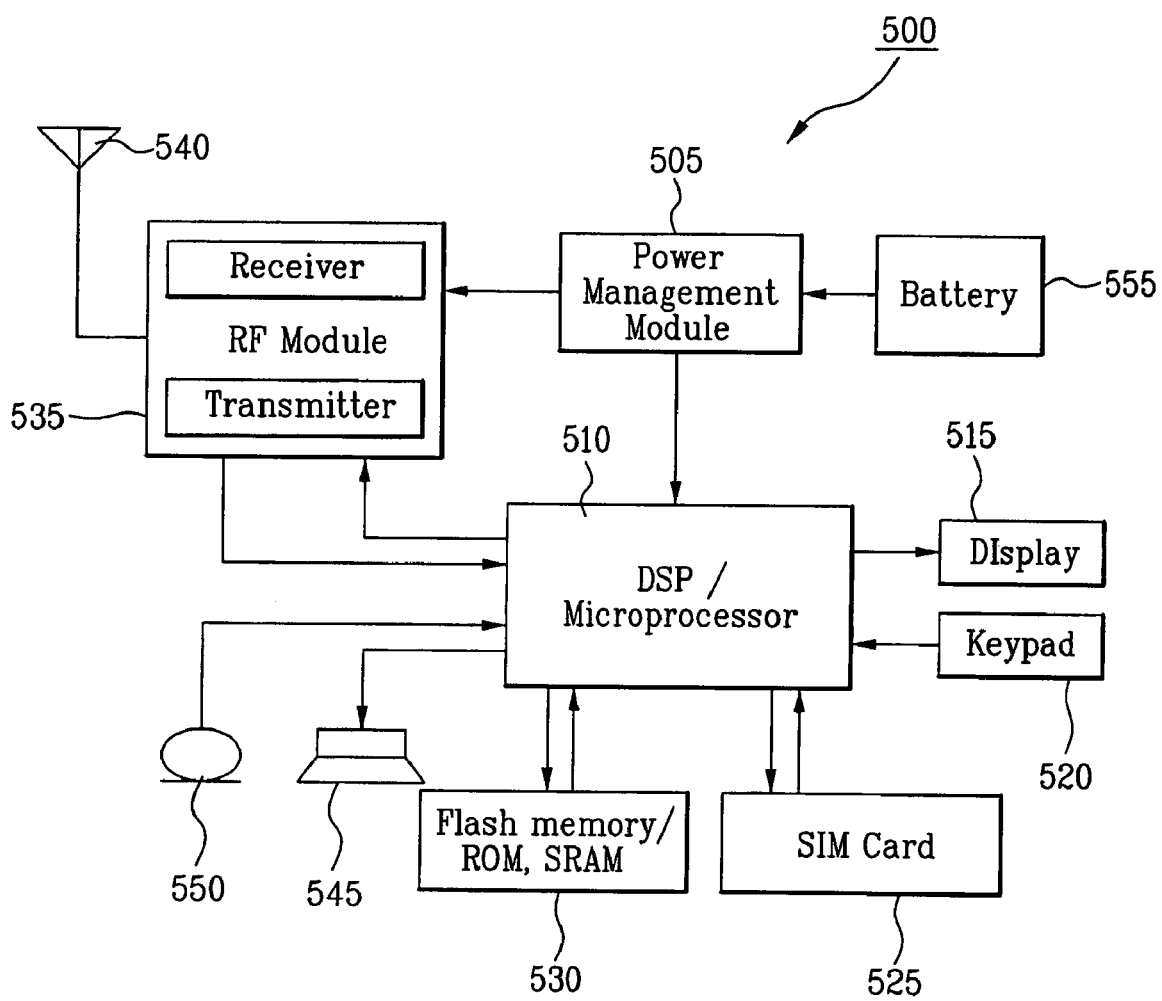
FIG. 15 illustrates the various components of an exemplary mobile terminal or mobile terminal 500, in accordance with embodiment of the invention.

FIG. 15 illustrates the various components of an exemplary mobile terminal or mobile terminal 500, in accordance with embodiment of the invention.

Referring to FIG. 15, the mobile terminal 500 comprises a processor (or digital signal processor) 510, RF module 535, power management module 505, antenna 540, battery 555, display 515, keypad 520, memory 530, SIM card 525 (which may be optional), speaker 545 and microphone 550.

A user enters instructional information, such as a telephone number, for example, by pushing the buttons of a keypad 520 or by voice activation using the microphone 550. The microprocessor 510 receives and processes the instructional information to perform the appropriate function, such as to dial the telephone number. Operational data may be retrieved from the Subscriber Identity Module (SIM) card 525 or the memory module 530 to perform the function. Furthermore, the processor 510 may display the instructional and operational information on the display 515 for the user's reference and convenience.

The processor 510 issues instructional information to the RF section 535, to initiate communication, for example, transmit radio signals comprising voice communication data. The RF section 535 comprises a receiver and a transmitter to receive and transmit radio signals. An antenna 540 facilitates the transmission and reception of radio signals. Upon receiving radio signals, the RF module 535 may forward and convert the signals to baseband frequency for processing by the processor 510. The processed signals would be transformed into audible or readable information outputted via the speaker 545, for example.

It will be apparent to one skilled in the art that the preferred embodiments of the present invention can be readily implemented using, for example, the processor 510 or other data or digital processing device, either alone or in combination with external support logic.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage media (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation describe specific operations as occurring in a particular order. In alternative implementations, certain of the logic operations may be performed in a different order, modified or removed and still implement preferred embodiments of the present invention. Moreover, steps may be added to the above described logic and still conform to implementations of the invention.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A fast call setup method in a mobile communication system, the method comprising:
monitoring a paging channel on a first predetermined slot cycle by a mobile terminal, the paging channel comprising a plurality of slots for monitoring by the mobile terminal;
communicating data between a network and the mobile terminal over a data channel;
sending to the network a release order (RO) message, wherein the release order (RO) message includes a request by the mobile terminal to release communication from the data channel;
receiving from the network an extended release message (ERM) authorizing release from the data channel, wherein the extended release message (ERM) includes a command to the mobile terminal to operate in a reduced slot cycle following the release from the data channel; and
transmitting an extended release response message (ERRM) to the network, the extended release response message (ERRM) includes timer information and a reduced slot cycle index, wherein the timer information provides time period for operation of the reduced slot cycle, the reduced slot cycle index provides the reduced slot cycle during which the mobile terminal is to monitor the paging channel following the release from the data channel, and the reduced slot cycle is $16 \times 2^i$, wherein i represents the reduced slot cycle index which is between −4 to 0.

2. The fast call setup method of claim 1, wherein the extended release response message (ERRM) further includes a time parameter for use by the mobile terminal to terminate monitoring of the paging channel using the reduced slot cycle upon expiration of time associated with the time parameter.

3. The fast call setup method of claim 2, further comprising:
transmitting a normal slotted mode message to the network prior to the expiration of time associated with the time parameter to allow the mobile terminal to monitor the paging channel according to the first predetermined cycle.

4. The fast call setup method of claim 2, further comprising:
receiving a normal slotted mode message from the network prior to the expiration of time associated with the time parameter to allow the mobile terminal to monitor the paging channel according to the first predetermined cycle.

5. The fast call setup method of claim 1, wherein the reduced slot cycle index is determined by: MAX (after-release minimum slot cycle index, MIN (a preferred slot cycle index provided by the mobile terminal, after-release maximum slot cycle index)).

6. The fast call setup method of claim 1, wherein the reduced slot cycle index is determined by: MAX (after-release slot cycle index, minimum mobile slot cycle index).

7. The fast call setup method of claim 1, wherein the reduced slot cycle index is determined by MAX (slot cycle index release, minimum mobile slot cycle index release), the method further comprising: transmitting the minimum mobile slot cycle index to the network for determining the reduced slot cycle by the network.

8. A fast call setup method in a mobile communication system, the method comprising:
sending on a paging channel a paging information for a mobile terminal, the paging channel comprising a plurality of slots for monitoring by the mobile terminal at a first predetermined cycle;
communicating data between a network and the mobile terminal over a data channel;
receiving from the mobile terminal a release order (RO) message, wherein the release order (RO) message includes a request by the mobile terminal to release communication from the data channel; and
sending to the mobile terminal an extended release message (ERM) authorizing release from the data channel, wherein the extended release message (ERM) includes a command to the mobile terminal to operate in a reduced slot cycle following the release from the data channel; and
receiving an extended release response message (ERRM) from the mobile terminal, the extended release response message (ERRM) includes timer information and a reduced slot cycle index, wherein the timer information provides time period for operation of the reduced slot cycle, the reduced slot cycle index provides the reduced slot cycle during which the mobile terminal is to monitor the paging channel following the release from the data channel, and the reduced slot cycle is $16 \times 2^i$, wherein i represents the reduced slot cycle index which is between −4 to 0.

9. The fast call setup method of claim 8, wherein the extended release response message (ERRM) further includes a time parameter for use by the mobile terminal to terminate monitoring of the paging channel using the reduced slot cycle upon expiration of time associated with the time parameter.

10. The fast call setup method of claim 9, further comprising:
receiving a normal slotted mode message from the mobile terminal prior to the expiration of time associated with the time parameter to allow the mobile terminal to monitor the paging channel according to the first predetermined cycle.

11. The fast call setup method of claim 9, further comprising:
transmitting a normal slotted mode message to the mobile terminal prior to the expiration of time associated with the time parameter to allow the mobile terminal to monitor the paging channel according to the first predetermined cycle.

12. The fast call setup method of claim 8, wherein the reduced slot cycle index is determined by: MAX (after-release minimum slot cycle index, MIN (a preferred slot cycle index provided by the mobile terminal, after-release maximum slot cycle index)).

13. The fast call setup method of claim 8, wherein the reduced slot cycle index is determined by: MAX (after-release slot cycle index, minimum mobile slot cycle index).

14. A fast call setup method in a mobile communication system, the method comprising:
sending over a paging channel a paging signal on a first predetermined slot cycle, the paging channel comprises a plurality of slots for monitoring by the mobile terminal;
communicating data between a network and the mobile terminal over a data channel; and
sending to the mobile terminal an extended release message (ERM), wherein the extended release message (ERM) includes authorization to release from the data channel, and a command to the mobile terminal to operate in a reduced slot cycle following the release from the data channel, allowing the mobile terminal to monitor the paging channel using the reduced slot cycle, receiving an extended release response message (ERRM) from the mobile terminal, the extended release response message (ERRM) includes timer information and a reduced slot cycle index, wherein the timer information provides time period for operation of the reduced slot cycle, the reduced slot cycle index provides the reduced slot cycle during which the mobile terminal is to monitor the paging channel, and the reduced slot cycle is $16 \times 2^i$, wherein i represents the reduced slot cycle index which is between −4 to 0.

15. The fast call setup method of claim 14, wherein the extended release response message (ERRM) further includes a time parameter for use by the mobile terminal to terminate monitoring of the paging channel using the reduced slot cycle upon expiration of time associated with the time parameter, and wherein the extended release response message (ERRM) is transmitted after the network authorizes the mobile terminal to release from the data channel.

16. The fast call setup method of claim 15, further comprising:
   receiving a normal slotted mode message from the mobile terminal prior to the expiration of time associated with the time parameter to allow the mobile terminal to monitor the paging channel according to the first predetermined cycle.

17. The fast call setup method of claim 15, further comprising:
   transmitting a normal slotted mode message to the mobile terminal prior to the expiration of time associated with the time parameter to allow the mobile terminal to monitor the paging channel according to the first predetermined cycle.

18. The fast call setup method of claim 14, wherein the reduced slot cycle index is determined by: MAX (after-release minimum slot cycle index, MIN (a preferred slot cycle index provided by the mobile terminal, after-release maximum slot cycle index)).

19. The fast call setup method of claim 14, wherein the reduced slot cycle index is determined by: MAX (after-release slot cycle index, minimum mobile slot cycle index).

20. The fast call setup method of claim 14, wherein the reduced slot cycle index is determined by MAX (slot cycle index release, minimum mobile slot cycle index release), the method further comprising: transmitting the minimum mobile slot cycle index to the network for determining the reduced slot cycle by the network.

21. A fast call setup method in a mobile communication system, the method comprising:
   receiving over a paging channel a paging signal on a first predetermined slot cycle, the paging channel comprises a plurality of slots for monitoring by the mobile terminal;
   communicating data between a network and the mobile terminal over a data channel;
   receiving from the network an extended release message (ERM), wherein the extended release message (ERM) includes authorization to release from the data channel and a command to the mobile terminal to operate in a reduced slot cycle following the release from the data channel, allowing the mobile terminal to monitor the paging channel using the reduced slot cycle; and
   transmitting an extended release response message (ERRM) to the network, the extended release response message (ERRM) includes timer information and a reduced slot cycle index, wherein the timer information provides time period for operation of the reduced slot cycle, the reduced slot cycle index provides the reduced slot cycle during which the mobile terminal is to monitor the paging channel, and the reduced slot cycle is $16 \times 2^i$, wherein i represents the reduced slot cycle index which is between −4 to 0.

22. The fast call setup method of claim 21, wherein the extended release response message (ERRM) further includes a time parameter for use by the mobile terminal to terminate monitoring of the paging channel using the reduced slot cycle upon expiration of time associated with the time parameter, and wherein the extended release response message (ERRM) is transmitted after the network authorizes the mobile terminal to release from the data channel.

23. The fast call setup method of claim 22, further comprising:
   receiving a normal slotted mode message from the mobile terminal prior to the expiration of time associated with the time parameter to allow the mobile terminal to monitor the paging channel according to the first predetermined cycle.

24. The fast call setup method of claim 22, further comprising:
   transmitting a normal slotted mode message to the network prior to the expiration of time associated with the time parameter to allow the mobile terminal to monitor the paging channel according to the first predetermined cycle.

25. A fast call setup method in a mobile communication system, the method comprising:
   monitoring a paging channel on a first predetermined slot cycle by a mobile terminal, the paging channel comprising a plurality of slots monitored by the mobile terminal;
   receiving from the network an extended release message (ERM), wherein the extended release message (ERM) includes authorization to release from a data channel and a command to the mobile terminal to operate in a reduced slot cycle following the release from the data channel, allowing the mobile terminal to monitor the data channel using the reduced slot cycle,
   transmitting an extended release response message (ERRM) to the network, the extended release response message (ERRM) includes timer information and a reduced slot cycle index, wherein the timer information provides time period for operation of the reduced slot cycle, the reduced slot cycle index provides the reduced slot cycle during which the mobile terminal is to monitor the data channel, and the reduced slot cycle is approximately equal to $16 \times 2^i$, wherein i represents the reduced slot cycle which is between −4 to 0.

26. The fast call setup method of claim 25, wherein the extended release response message (ERRM) further includes a time parameter for use by the mobile terminal to terminate monitoring of the paging channel using the reduced slot cycle upon expiration of time associated with the time parameter, and wherein the extended release response message (ERRM) is transmitted after the network authorizes the mobile terminal to release from the data channel.

27. A fast call setup method in a mobile communication system, the method comprising:
   monitoring a first channel on a first predetermined slot cycle by a mobile terminal, the first channel comprising a plurality of slots for monitoring by the mobile terminal;

communicating data between a network and the mobile terminal over a second channel;

receiving from the network an extended release message (ERM) sent over an overhead channel utilized by a plurality of mobile terminals, wherein the extended release message (ERM) comprises a command to the mobile terminal to operate in a reduced slot cycle following the release from the second channel, allowing the mobile terminal to monitor the first channel using the reduced slot cycle; and transmitting an extended release response message (ERRM) to the network, the extended release response message (ERRM) includes a timer information and a reduced slot cycle index, wherein the timer information provides time period for operation of the reduced slot cycle, the reduced slot cycle index provides the reduced slot cycle during which the mobile terminal is to monitor the first channel, and the reduced slot cycle is approximately equal to $16 \times 2^i$, wherein i represents the slot cycle index which is between −4 to 0.

28. The method of claim 27, further comprising:
monitoring the first channel using the reduced slot cycle after releasing the second channel.

29. The method of claim 27, wherein the first channel is one of a paging channel and a common control channel, and the second channel is a traffic channel.

30. A mobile terminal for communicating with a network to expedite call setup, the mobile terminal comprising:

means for monitoring a paging channel on a first predetermined slot cycle by a mobile terminal, the paging channel comprising a plurality of slots for monitoring by the mobile terminal;

means for communicating data between a network and the mobile terminal over a data channel;

means for sending to the network a release order (RO) message being sent, wherein the release order (RO) message includes a request by the mobile terminal to release communication from the data channel;

means for receiving from the network an extended release message (ERM) authorizing release from the data channel, wherein the extended release message (ERM) includes a command to the mobile terminal to operate in a reduced slot cycle following the release from the data channel; and means for transmitting an extended release response message (ERRM) to the network, the extended release response message (ERRM) includes a timer information and a reduced slot cycle index, wherein the timer information provides time period for operation of the reduced slot cycle, the reduced slot cycle index provides the reduced slot cycle during which the mobile terminal is to monitor the paging channel, and the reduced slot cycle is $16 \times 2^i$, wherein i represents the reduced slot cycle index which is between −4 to 0.

31. The mobile terminal of claim 30, wherein the extended release response message (ERRM) further includes a time parameter for use by the mobile terminal to terminate monitoring of the paging channel using the reduced slot cycle upon expiration of time associated with the time parameter.

32. The mobile terminal of claim 31, further comprising:
means for transmitting a normal slotted mode message to the network prior to the expiration of time associated with the time parameter to allow the mobile terminal to monitor the paging channel according to the first predetermined cycle.

33. The mobile terminal of claim 31, further comprising;
means for receiving a normal slotted mode message from the network prior to the expiration of time associated with the time parameter to allow the mobile terminal to monitor the paging channel according to the first predetermined cycle.

34. A network for communicating with a mobile terminal to expedite call setup, the network comprising:

means for sending over a paging channel a paging signal on a first predetermined slot cycle, the paging channel comprises a plurality of slots for monitoring by the mobile terminal;

means for communicating data between a network and the mobile terminal over a data channel;

means for receiving a release order (RO) message being sent from the mobile terminal, wherein the release order (RO) message includes a requested by the mobile terminal to release communication from the data channel; and means for sending with the mobile terminal an extended release message (ERM), wherein the extended release message (ERM) includes authorization to release from the data channel and a command to the mobile terminal to operate in a reduced slot cycle following the release from the data channel, allowing the mobile terminal to monitor the paging channel the reduced slot cycle, means for receiving an extended release response message (ERRM) to the network, the extended release response message (ERRM) includes a timer information and a reduced slot cycle index, wherein the timer information provides time period for operation of the reduced slot cycle, the reduced slot cycle index provides the reduced slot cycle during which the mobile terminal is to monitor the paging channel, and the reduced slot cycle is $16 \times 2^i$, wherein i represents the reduced slot cycle index which is between −4 to 0.

35. The network of claim 34, wherein the extended release message (ERM) comprises a time parameter for use by the mobile terminal to terminate monitoring of the paging channel using the reduced slot cycle upon expiration of time associated with the time parameter.

36. The network of claim 35, further comprising:
means for receiving a normal slotted mode message from the mobile terminal prior to the expiration of time associated with the time parameter to allow the mobile terminal to monitor the paging channel according to the first predetermined cycle.

37. The network of claim 35, further comprising:
means for transmitting a normal slotted mode message to the mobile terminal prior to the expiration of time associated with the time parameter to allow the mobile terminal to monitor the paging channel according to the first predetermined cycle.

38. The fast call setup method of claim 1, wherein the extended release response message (ERRM) is transmitted after the network authorizes the mobile terminal to release from the data channel.

39. The fast call setup method of claim 1, wherein the release order (RO) message is sent before the network authorizes the mobiles terminal to release from the data channel.

40. The fast call setup method of claim 8, wherein the extended release response message (ERRM) is transmitted after the network authorizes the mobile terminal to release from the data channel.

41. The fast call setup method of claim 8, wherein the release order (RO) message is sent before the network authorizes the mobiles terminal to release from the data channel.

* * * * *